(12) United States Patent
Gao et al.

(10) Patent No.: US 10,115,005 B2
(45) Date of Patent: Oct. 30, 2018

(54) METHODS AND SYSTEMS OF UPDATING MOTION MODELS FOR OBJECT TRACKERS IN VIDEO ANALYTICS

(71) Applicant: QUALCOMM Incorporated, San Diego, CA (US)

(72) Inventors: Jinglun Gao, Milpitas, CA (US); Ying Chen, San Diego, CA (US); Lei Wang, Clovis, CA (US); Ning Bi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 104 days.

(21) Appl. No.: 15/384,997

(22) Filed: Dec. 20, 2016

(65) Prior Publication Data

US 2018/0046857 A1 Feb. 15, 2018

Related U.S. Application Data

(60) Provisional application No. 62/374,671, filed on Aug. 12, 2016.

(51) Int. Cl.
*G06K 9/00* (2006.01)
*G06T 7/246* (2017.01)

(52) U.S. Cl.
CPC ..... *G06K 9/00335* (2013.01); *G06K 9/00718* (2013.01); *G06K 9/00771* (2013.01);
(Continued)

(58) Field of Classification Search
None
See application file for complete search history.

(56) References Cited

U.S. PATENT DOCUMENTS 8,098,888 B1 * 1/2012 Mummareddy ... G06K 9/00778
382/103
8,325,982 B1 * 12/2012 Moon ................ G06K 9/00771
348/169

(Continued)

OTHER PUBLICATIONS

Gabriel P.F., et al., "The State of the Art in Multiple Object Tracking Under Occlusion in Video Sequences", Advanced Concepts for Intelligent Vision Systems, Jan. 1, 2003, XP55407285, 8 pages.

(Continued)

*Primary Examiner* — Shervin Nakhjavan
(74) *Attorney, Agent, or Firm* — Polsinelli/Qualcomm

(57) ABSTRACT

Techniques and systems are provided for processing video data. For example, techniques and systems are provided for performing context-aware object or blob tracker updates (e.g., by updating a motion model of a blob tracker). In some cases, to perform a context-aware blob tracker update, a blob tracker is associated with a first blob. The first blob includes pixels of at least a portion of one or more foreground objects in one or more video frames. A split of the first blob and a second blob in a current video frame can be detected, and a motion model of the blob tracker is reset in response to detecting the split of the first blob and the second blob. In some cases, a motion model of a blob tracker associated with a merged blob is updated to include a predicted location of the blob tracker in a next video frame. The motion model can be updated by using a previously predicted location of blob tracker as the predicted location of the blob tracker in the next video frame in response to the blob tracker being associated with the merged blob. The previously predicted location of the blob tracker can be determined using a blob location of a blob from a previous video frame.

30 Claims, 12 Drawing Sheets

(52) U.S. Cl.
CPC .... *G06T 7/246* (2017.01); *G06T 2207/30232* (2013.01); *G06T 2207/30241* (2013.01)

(56) References Cited

U.S. PATENT DOCUMENTS

| | | | |
|---|---|---|---|
| 2005/0104958 A1* | 5/2005 | Egnal | G01S 3/7864 348/143 |
| 2006/0268111 A1* | 11/2006 | Zhang | G01S 3/7864 348/169 |
| 2007/0086621 A1* | 4/2007 | Aggarwal | G06K 9/00369 382/103 |
| 2008/0063236 A1 | 3/2008 | Ikenoue et al. | |
| 2008/0181453 A1* | 7/2008 | Xu | G06T 7/215 382/103 |
| 2008/0240496 A1* | 10/2008 | Senior | G06T 7/251 382/103 |
| 2011/0098056 A1* | 4/2011 | Rhoads | G01C 21/20 455/456.1 |
| 2012/0321128 A1 | 12/2012 | Medioni et al. | |
| 2014/0205141 A1 | 7/2014 | Gao et al. | |
| 2015/0256850 A1 | 9/2015 | Kottke et al. | |
| 2016/0275695 A1 | 9/2016 | Luczak et al. | |
| 2016/0379074 A1* | 12/2016 | Nielsen | G06K 9/3241 348/143 |

OTHER PUBLICATIONS

International Search Report and Written Opinion—PCT/US2017/035485—ISA/EPO—dated Oct. 2, 2017.
Jodoin J-P., et al., "Urban Tracker: Multiple Object Tracking in Urban Mixed Traffic", IEEE Winter Conference on Applications of Computer Vision, Mar. 24, 2014, pp. 885-892, XP032609920, [retrieved on Jun. 16, 2014].
Teutsch M., et al., "Detection, Segmentation, and Tracking of Moving Objects in UAV Videos", 2012 IEEE Ninth International Conference on Advanced Video and Signal-Based Surveillance, Sep. 18, 2012, pp. 313-318, XP032248245.

\* cited by examiner

900A

900B

900C

1100

ASSOCIATE A FIRST TRACKER AND A SECOND TRACKER WITH A MERGED BLOB OF A CURRENT VIDEO FRAME, THE MERGED BLOB INCLUDING PIXELS OF AT LEAST A PORTION OF ONE OR MORE FOREGROUND OBJECTS IN THE CURRENT VIDEO FRAME, WHEREIN THE MERGED BLOB INCLUDES A FIRST BLOB MERGED WITH A SECOND BLOB
1102

UPDATE A MOTION MODEL OF THE FIRST TRACKER TO INCLUDE A PREDICTED LOCATION OF THE FIRST TRACKER IN A NEXT VIDEO FRAME, WHEREIN THE MOTION MODEL IS UPDATED USING A PREVIOUSLY PREDICTED LOCATION OF THE FIRST TRACKER DETERMINED USING A BLOB LOCATION IN A PREVIOUS VIDEO FRAME, THE PREVIOUSLY PREDICTED LOCATION OF THE FIRST TRACKER BEING USED TO UPDATE THE MOTION MODEL IN RESPONSE TO THE FIRST TRACKER AND THE SECOND TRACKER BEING ASSOCIATED WITH THE MERGED BLOB
1104

ASSOCIATE A FIRST TRACKER WITH A FIRST BLOB, THE FIRST BLOB INCLUDING PIXELS OF AT LEAST A PORTION OF ONE OR MORE FOREGROUND OBJECTS IN ONE OR MORE VIDEO FRAMES
1202

↓

DETECT A SPLIT OF THE FIRST BLOB AND A SECOND BLOB IN A CURRENT VIDEO FRAME
1204

↓

RESET A MOTION MODEL OF THE FIRST TRACKER IN RESPONSE TO DETECTING THE SPLIT OF THE FIRST BLOB AND THE SECOND BLOB
1206

FIG. 12

METHODS AND SYSTEMS OF UPDATING MOTION MODELS FOR OBJECT TRACKERS IN VIDEO ANALYTICS

CROSS-REFERENCE TO RELATED APPLICATIONS

This application claims the benefit of U.S. Provisional Application No. 62/374,671, filed Aug. 12, 2016, which is hereby incorporated by reference, in its entirety.

FIELD

The present disclosure generally relates to video analytics, and more specifically to techniques and systems for updating motion models for object trackers in video analytics.

BACKGROUND

Many devices and systems allow a scene to be captured by generating video data of the scene. For example, an Internet protocol camera (IP camera) is a type of digital video camera that can be employed for surveillance or other applications. Unlike analog closed circuit television (CCTV) cameras, an IP camera can send and receive data via a computer network and the Internet. The video data from these devices and systems can be captured and output for processing and/or consumption.

Video analytics, also referred to as Video Content Analysis (VCA), is a generic term used to describe computerized processing and analysis of a video sequence acquired by a camera. Video analytics provides a variety of tasks, including immediate detection of events of interest, analysis of pre-recorded video for the purpose of extracting events in a long period of time, and many other tasks. For instance, using video analytics, a system can automatically analyze the video sequences from one or more cameras to detect one or more events. In some cases, video analytics can send alerts or alarms for certain events of interest. More advanced video analytics is needed to provide efficient and robust video sequence processing.

BRIEF SUMMARY

In some embodiments, techniques and systems are described for performing context-aware motion model updates for object (or blob) trackers used for object tracking in video analytics. A blob represents at least a portion of one or more objects in a video frame (also referred to as a "picture"). In some examples, a context-aware motion model for a blob tracker associated with one or more blobs can be adaptively updated based on the associated one or more blobs (spatial context) and/or a temporal context of the tracker (e.g., a life status of the tracker) in the current frame.

In some examples, using video analytics, background subtraction is applied to one or more frames of captured video and a foreground-background binary mask (referred to herein as a foreground mask) is generated for each frame. In some cases, morphology operations can be applied to a foreground mask of a frame to reduce noise present in the foreground mask. Connected component analysis can be performed (after background subtraction or after morphology operations) to generate connected components from the foreground mask. Blobs may then be identified for the current frame based on the connected components. The blobs can be provided, for example, for blob processing, object tracking, and other video analytics functions.

After blobs are identified, data association can be performed to match (or associate) the blobs with blob trackers based on costs between the blobs and trackers. Once a tracker is matched with one or more blobs, a motion model for the tracker is updated accordingly. For example, updated information for a tracker conveys both the tracking information of the current frame and also a prediction of the tracker in a next frame. Prediction of the tracker for the next frame given its current frame information is critical for the success of object tracking. The techniques and systems described herein can perform context-aware motion model updates for blob trackers.

According to at least one example of maintaining one or more motion models for one or more blob trackers, a method is provided that includes associating a first tracker with a first blob. The first blob includes pixels of at least a portion of one or more foreground objects in one or more video frames. The method further includes detecting a split of the first blob and a second blob in a current video frame. The method further includes resetting a motion model of the first tracker in response to detecting the split of the first blob and the second blob.

In another example, an apparatus for maintaining one or more motion models for one or more blob trackers is provided that includes a memory configured to store video data and a processor. The processor is configured to and can associate a first tracker with a first blob. The first blob includes pixels of at least a portion of one or more foreground objects in one or more video frames. The processor is configured to and can detect a split of the first blob and a second blob in a current video frame. The processor is configured to and can reset a motion model of the first tracker in response to detecting the split of the first blob and the second blob.

In another example, a computer readable medium is provided having stored thereon instructions that when executed by a processor perform a method that includes: associating a first tracker with a first blob, the first blob including pixels of at least a portion of one or more foreground objects in one or more video frames; detecting a split of the first blob and a second blob in a current video frame; and resetting a motion model of the first tracker in response to detecting the split of the first blob and the second blob.

In another example, an apparatus is provided that includes means for associating a first tracker with a first blob, the first blob including pixels of at least a portion of one or more foreground objects in one or more video frames. The apparatus further comprises means for detecting a split of the first blob and a second blob in a current video frame. The apparatus further comprises means for resetting a motion model of the first tracker in response to detecting the split of the first blob and the second blob.

In some aspects, resetting the motion model includes eliminating from the motion model one or more previously determined locations for the first tracker.

In some aspects, the methods, apparatuses, and computer medium described above further comprise reinitializing the motion model of the first tracker using a location of the first blob in the current video frame.

In some aspects, the first blob and the second blob are merged into a merged blob in a previous video frame, the previous video frame being obtained earlier in time than the current video frame.

In some aspects, the first tracker and a second tracker are associated with the merged blob in the previous video frame.

In some aspects, the methods, apparatuses, and computer medium described above further comprise: associating a third tracker with a merged blob in the current video frame, the merged blob including a third blob merged with a fourth blob, and wherein multiple trackers are associated with the merged blob in the current video frame; and updating a motion model of the third tracker to include a predicted location of the third tracker in a next video frame, wherein the motion model is updated by using a previously predicted location of the third tracker as the predicted location of the third tracker in the next video frame in response to the third tracker being associated with the merged blob, the previously predicted location of the third tracker being determined using a blob location in a previous video frame.

In some aspects, the third tracker is associated with the third blob in the previous video frame, and wherein a fourth tracker is associated with the fourth blob in the previous video frame.

In some aspects, the blob location in the previous video frame includes a location of the third blob in the previous video frame before the third blob is merged with the fourth blob.

In some aspects, the motion model of the first tracker is maintained using a Kalman filter.

In some aspects, the motion model of the first tracker includes one or more locations of the first tracker, a velocity of the first tracker, and one or more sizes of one or more blobs associated with the first tracker.

According to at least one other example of maintaining one or more motion models for one or more blob trackers, a method is provided that includes associating a first tracker and a second tracker with a merged blob of a current video frame. The merged blob includes pixels of at least a portion of one or more foreground objects in the current video frame, and includes a first blob merged with a second blob. The method further includes updating a motion model of the first tracker to include a predicted location of the first tracker in a next video frame. The motion model is updated by using a previously predicted location of the first tracker as the predicted location of the first tracker in the next video frame in response to the first tracker being associated with the merged blob. The previously predicted location of the first tracker is determined using a blob location in a previous video frame.

In another example, an apparatus is provided that includes a memory configured to store video data and a processor. The processor is configured to and can associate a first tracker and a second tracker with a merged blob of a current video frame. The merged blob includes pixels of at least a portion of one or more foreground objects in the current video frame, and includes a first blob merged with a second blob. The processor is configured to and can update a motion model of the first tracker to include a predicted location of the first tracker in a next video frame. The motion model is updated by using a previously predicted location of the first tracker as the predicted location of the first tracker in the next video frame in response to the first tracker being associated with the merged blob. The previously predicted location of the first tracker is determined using a blob location in a previous video frame.

In another example, a computer readable medium is provided having stored thereon instructions that when executed by a processor perform a method that includes: associating a first tracker and a second tracker with a merged blob of a current video frame, the merged blob including pixels of at least a portion of one or more foreground objects in the current video frame, wherein the merged blob includes a first blob merged with a second blob; and updating a motion model of the first tracker to include a predicted location of the first tracker in a next video frame, wherein the motion model is updated by using a previously predicted location of the first tracker as the predicted location of the first tracker in the next video frame in response to the first tracker being associated with the merged blob, the previously predicted location of the first tracker being determined using a blob location in a previous video frame.

In another example, an apparatus is provided that includes means for associating a first tracker and a second tracker with a merged blob of a current video frame. The merged blob includes pixels of at least a portion of one or more foreground objects in the current video frame, and includes a first blob merged with a second blob. The apparatus further comprises means for updating a motion model of the first tracker to include a predicted location of the first tracker in a next video frame. The motion model is updated by using a previously predicted location of the first tracker as the predicted location of the first tracker in the next video frame in response to the first tracker being associated with the merged blob. The previously predicted location of the first tracker is determined using a blob location in a previous video frame.

In some aspects, the first tracker is associated with the first blob in the previous video frame, and the second tracker is associated with the second blob in the previous video frame.

In some aspects, the blob location in the previous video frame includes a location of the first blob in the previous video frame before the first blob is merged with the second blob.

In some aspects, the methods, apparatuses, and computer readable medium described above further comprise: detecting a split of the merged blob in a subsequent video frame, the split including the first blob splitting from the merged blob, wherein the subsequent video frame is obtained later in time than the current video frame; and resetting the motion model of the first tracker in response to detecting the split of the first blob from the merged blob.

In some aspects, resetting the motion model includes eliminating from the motion model one or more previously determined locations for the first tracker.

In some aspects, the methods, apparatuses, and computer readable medium described above further comprise reinitializing the motion model for the first tracker using a location of a blob in the subsequent video frame. In such aspects, the first tracker is associated with the blob in the subsequent video frame.

In some aspects, the motion model of the first tracker is maintained using a Kalman filter.

In some aspects, the motion model includes one or more locations of the first tracker, a velocity of the first tracker, and one or more sizes of one or more blobs associated with the first tracker.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 11 is a flowchart illustrating an example of a process of maintaining one or more motion models for one or more blob trackers, in accordance with some embodiments.

FIG. 12 is a flowchart illustrating another example of a process of maintaining one or more motion models for one or more blob trackers, in accordance with some embodiments.

DETAILED DESCRIPTION

Figure 1:
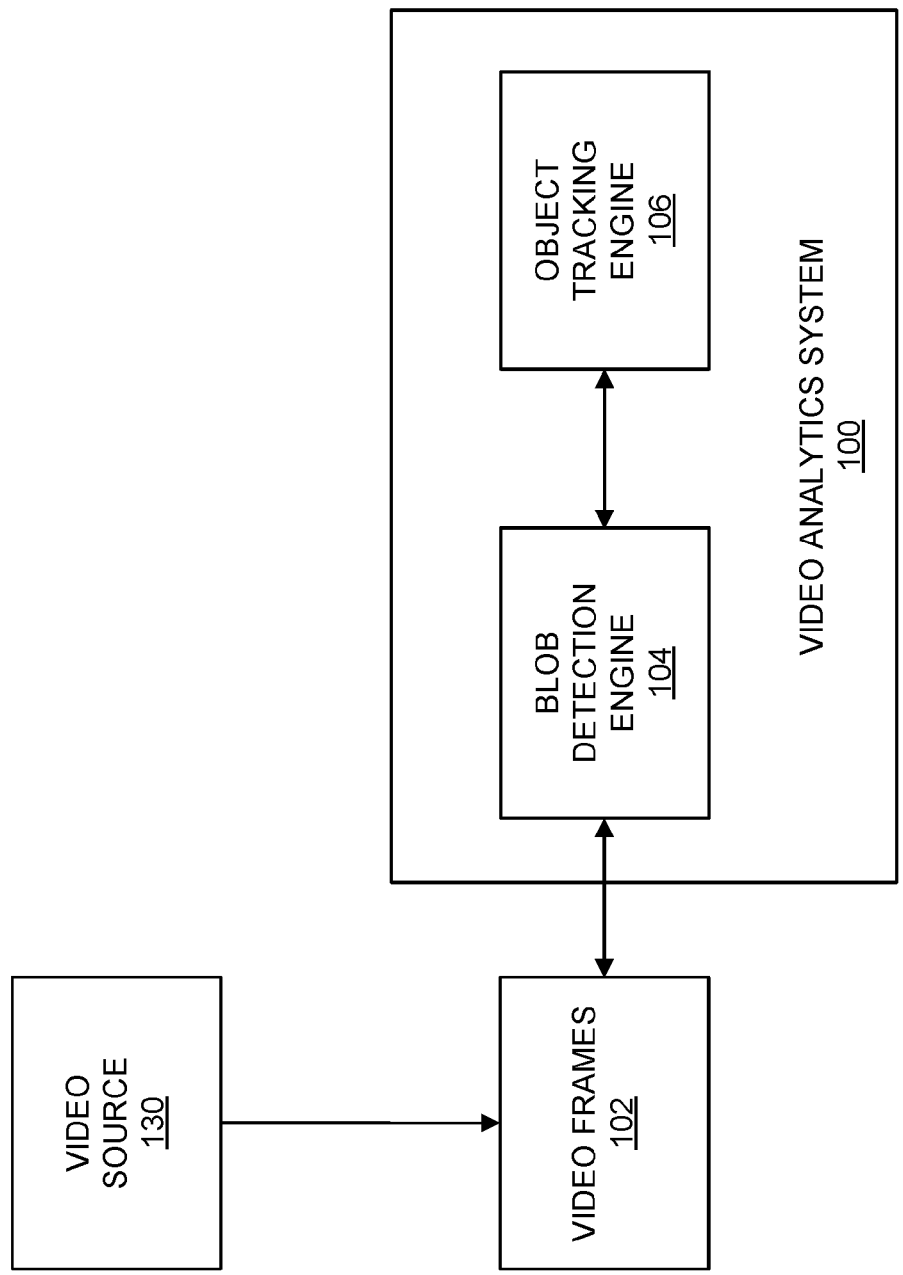
FIG. 1 is a block diagram illustrating an example of a system including a video source and a video analytics system, in accordance with some embodiments.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

A video analytics system can obtain a video sequence from a video source and can process the video sequence to provide a variety of tasks. One example of a video source can include an Internet protocol camera (IP camera), or other video capture device. An IP camera is a type of digital video camera that can be used for surveillance, home security, or other suitable application. Unlike analog closed circuit television (CCTV) cameras, an IP camera can send and receive data via a computer network and the Internet. In some instances, one or more IP cameras can be located in a scene or an environment, and can remain static while capturing video sequences of the scene or environment.

An IP camera can be used to send and receive data via a computer network and the Internet. In some cases, IP camera systems can be used for two-way communications. For example, data (e.g., audio, video, metadata, or the like) can be transmitted by an IP camera using one or more network cables or using a wireless network, allowing users to communicate with what they are seeing. In one illustrative example, a gas station clerk can assist a customer with how to use a pay pump using video data provided from an IP camera (e.g., by viewing the customer's actions at the pay pump). Commands can also be transmitted for pan, tilt, zoom (PTZ) cameras via a single network or multiple networks. Furthermore, IP camera systems provide flexibility and wireless capabilities. For example, IP cameras provide for easy connection to a network, adjustable camera location, and remote accessibility to the service over Internet. IP camera systems also provide for distributed intelligence. For example, with IP cameras, video analytics can be placed in the camera itself. Encryption and authentication is also easily provided with IP cameras. For instance, IP cameras offer secure data transmission through already defined encryption and authentication methods for IP based applications. Even further, labor cost efficiency is increased with IP cameras. For example, video analytics can produce alarms for certain events, which reduces the labor cost in monitoring all cameras (based on the alarms) in a system.

Video analytics provides a variety of tasks ranging from immediate detection of events of interest, to analysis of pre-recorded video for the purpose of extracting events in a long period of time, as well as many other tasks. Various research studies and real-life experiences indicate that in a surveillance system, for example, a human operator typically cannot remain alert and attentive for more than 20 minutes, even when monitoring the pictures from one camera. When there are two or more cameras to monitor or as time goes beyond a certain period of time (e.g., 20 minutes), the operator's ability to monitor the video and effectively respond to events is significantly compromised. Video analytics can automatically analyze the video sequences from the cameras and send alarms for events of interest. This way, the human operator can monitor one or more scenes in a passive mode. Furthermore, video analytics can analyze a huge volume of recorded video and can extract specific video segments containing an event of interest.

Video analytics also provides various other features. For example, video analytics can operate as an Intelligent Video Motion Detector by detecting moving objects and by tracking moving objects. In some cases, the video analytics can generate and display a bounding box around a valid object. Video analytics can also act as an intrusion detector, a video counter (e.g., by counting people, objects, vehicles, or the like), a camera tamper detector, an object left detector, an object/asset removal detector, an asset protector, a loitering detector, and/or as a slip and fall detector. Video analytics can further be used to perform various types of recognition functions, such as face detection and recognition, license plate recognition, object recognition (e.g., bags, logos, body marks, or the like), or other recognition functions. In some cases, video analytics can be trained to recognize certain objects. Another function that can be performed by video analytics includes providing demographics for customer metrics (e.g., customer counts, gender, age, amount of time spent, and other suitable metrics). Video analytics can also perform video search (e.g., extracting basic activity for a given region) and video summary (e.g., extraction of the key movements). In some instances, event detection can be performed by video analytics, including detection of fire, smoke, fighting, crowd formation, or any other suitable even the video analytics is programmed to or learns to detect. A detector can trigger the detection of event of interest and sends an alert or alarm to a central control room to alert a user of the event of interest.

As noted previously, a video analytics system can generate and detect foreground blobs that can be used to perform various operations, such as object tracking or other operations described above. A blob tracker can be used to track one or more blobs in a video sequence. A blob tracker can start to be associated with a blob in one frame, and can be connected with blobs across one or more subsequent frames. A motion model can be maintained for the blob tracker, and can include one or more locations of the blob tracker (e.g., a location in a current frame, a predicted location in a next frame, a combination thereof, or other suitable location), a velocity of the blob tracker, any combination thereof, or other suitable status of the blob tracker. Systems and methods are described herein for performing context-aware motion model updates for blob (or object) trackers. As described in more detail below, a context-aware motion model for a blob tracker associated with one or more blobs can be adaptively updated based on a status of the associated one or more blobs (spatial context) and/or a temporal status of the blob tracker.

FIG. 1 is a block diagram illustrating an example of a video analytics system 100. The video analytics system 100 receives video frames 102 from a video source 130. The video frames 102 can also be referred to herein as a video picture or a picture. The video frames 102 can be part of one or more video sequences. The video source 130 can include a video capture device (e.g., a video camera, a camera phone, a video phone, or other suitable capture device), a video storage device, a video archive containing stored video, a video server or content provider providing video data, a video feed interface receiving video from a video server or content provider, a computer graphics system for generating computer graphics video data, a combination of such sources, or other source of video content. In one example, the video source 130 can include an IP camera or multiple IP cameras. In an illustrative example, multiple IP cameras can be located throughout an environment, and can provide the video frames 102 to the video analytics system 100. For instance, the IP cameras can be placed at various fields of view within the environment so that surveillance can be performed based on the captured video frames 102 of the environment.

In some embodiments, the video analytics system 100 and the video source 130 can be part of the same computing device. In some embodiments, the video analytics system 100 and the video source 130 can be part of separate computing devices. In some examples, the computing device (or devices) can include one or more wireless transceivers for wireless communications. The computing device (or devices) can include an electronic device, such as a camera (e.g., an IP camera or other video camera, a camera phone, a video phone, or other suitable capture device), a mobile or stationary telephone handset (e.g., smartphone, cellular telephone, or the like), a desktop computer, a laptop or notebook computer, a tablet computer, a set-top box, a television, a display device, a digital media player, a video gaming console, a video streaming device, or any other suitable electronic device.

The video analytics system 100 includes a blob detection engine 104 and an object tracking engine 106. Object detection and tracking allows the video analytics system 100 to provide various end-to-end features, such as the video analytics features described above. For example, intelligent motion detection, intrusion detection, and other features can directly use the results from object detection and tracking to generate end-to-end events. Other features, such as people, vehicle, or other object counting and classification can be greatly simplified based on the results of object detection and tracking. The blob detection engine 104 can detect one or more blobs in video frames (e.g., video frames 102) of a video sequence, and the object tracking engine 106 can track the one or more blobs across the frames of the video sequence. As used herein, a blob refers to pixels of at least a portion of an object in a video frame. For example, a blob can include a contiguous group of pixels making up at least a portion of a foreground object in a video frame. In another example, a blob can refer to a contiguous group of pixels making up at least a portion of a background object in a frame of image data. A blob can also be referred to as an object, a portion of an object, a blotch of pixels, a pixel patch, a cluster of pixels, a blot of pixels, a spot of pixels, a mass of pixels, or any other term referring to a group of pixels of an object or portion thereof. In some examples, a bounding box can be associated with a blob. In some examples, a tracker can also be represented by a tracker bounding box. In the tracking layer, in case there is no need to know how the blob is formulated within a bounding box, the term blob and bounding box may be used interchangeably.

As described in more detail below, blobs can be tracked using blob trackers. A blob tracker can be associated with a tracker bounding box and can be assigned a tracker identifier (ID). In some examples, a bounding box for a blob tracker in a current frame can be the bounding box of a previous blob in a previous frame for which the blob tracker was associated. For instance, when the blob tracker is updated in the previous frame (after being associated with the previous blob in the previous frame), updated information for the blob tracker can include the tracking information for the previous frame and also prediction of a location of the blob tracker in the next frame (which is the current frame in this example). The prediction of the location of the blob tracker in the current frame can be based on the location of the blob in the previous frame. A history or motion model can be maintained for a blob tracker, including a history of various states, a history of the velocity, and a history of location, of continuous frames, for the blob tracker, as described in more detail below.

As described in more detail below, a motion model for a blob tracker can determine and maintain two locations of the blob tracker for each frame (e.g., a first location that includes a predicted location in the current frame and a second location that includes a location in the current frame of a blob with which the tracker is associated in the current frame). As also described in more detail below, the velocity of a blob tracker can include the displacement of a blob tracker between consecutive frames.

Using the blob detection engine 104 and the object tracking engine 106, the video analytics system 100 can perform blob generation and detection for each frame or picture of a video sequence. For example, the blob detection engine 104 can perform background subtraction for a frame, and can then detect foreground pixels in the frame. Foreground blobs are generated from the foreground pixels using morphology operations and spatial analysis. Further, blob trackers from previous frames need to be associated with the foreground blobs in a current frame, and also need to be updated. Both the data association of trackers with blobs and tracker updates can rely on a cost function calculation. For example, when blobs are detected from a current input video frame, the blob trackers from the previous frame can be associated with the detected blobs according to a cost calculation. Trackers are then updated according to the data association, including updating the state and location of the trackers so that tracking of objects in the current frame can be fulfilled. Further details related to the blob detection engine 104 and the object tracking engine 106 are described with respect to FIGS. 3-4.

Figure 2:
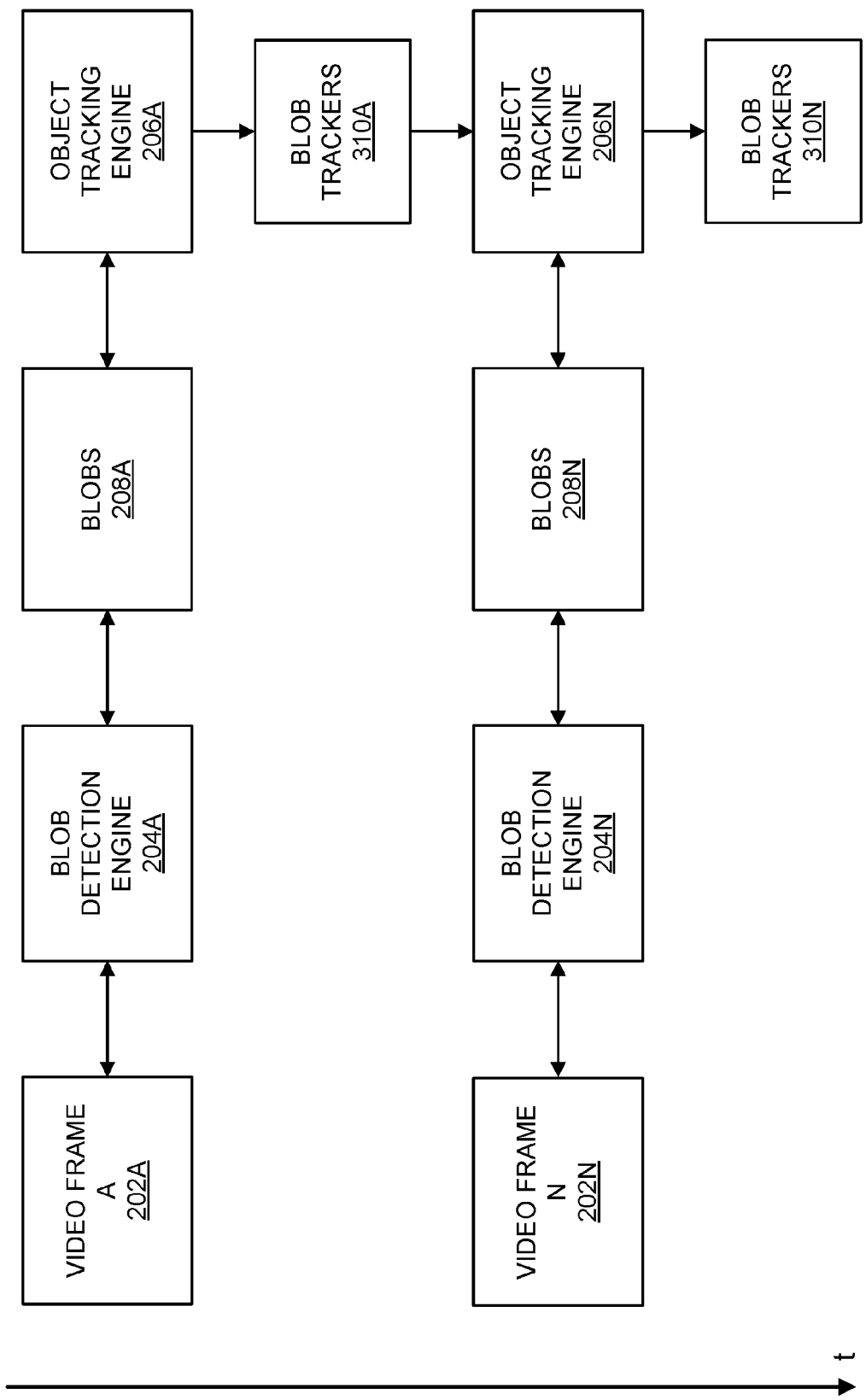
FIG. 2 is an example of a video analytics system processing video frames, in accordance with some embodiments.

FIG. 2 is an example of the video analytics system (e.g., video analytics system 100) processing video frames across time t. As shown in FIG. 2, a video frame A 202A is received by a blob detection engine 204A. The blob detection engine 204A generates foreground blobs 208A for the current frame A 202A. After blob detection is performed, the foreground blobs 208A can be used for temporal tracking by the object tracking engine 206A. Costs (e.g., a cost including a distance, a weighted distance, or other cost) between blob trackers and blobs can be calculated by the object tracking engine 206A. The object tracking engine 206A can perform data association to associate or match the blob trackers (e.g., blob trackers generated or updated based on a previous frame or newly generated blob trackers) and blobs 208A using the calculated costs (e.g., using a cost matrix or other suitable association technique). The blob trackers can be updated, including in terms of positions of the trackers, according to the data association to generate updated blob trackers 310A. For example, a blob tracker's state and location for the video frame A 202A can be calculated and updated. The blob tracker's location in a next video frame N 202N can also be predicted from the current video frame A 202A. For example, the predicted location of a blob tracker for the next video frame N 202N can include the location of the blob tracker (and its associated blob) in the current video frame A 202A. Tracking of blobs of the current frame A 202A can be performed once the updated blob trackers 310A are generated.

When a next video frame N 202N is received, the blob detection engine 204N generates foreground blobs 208N for the frame N 202N. The object tracking engine 206N can then perform temporal tracking of the blobs 208N. For example, the object tracking engine 206N obtains the blob trackers 310A that were updated based on the prior video frame A 202A. The object tracking engine 206N can then calculate a cost and can associate the blob trackers 310A and the blobs 208N using the newly calculated cost. The blob trackers 310A can be updated according to the data association to generate updated blob trackers 310N.

Figure 3:
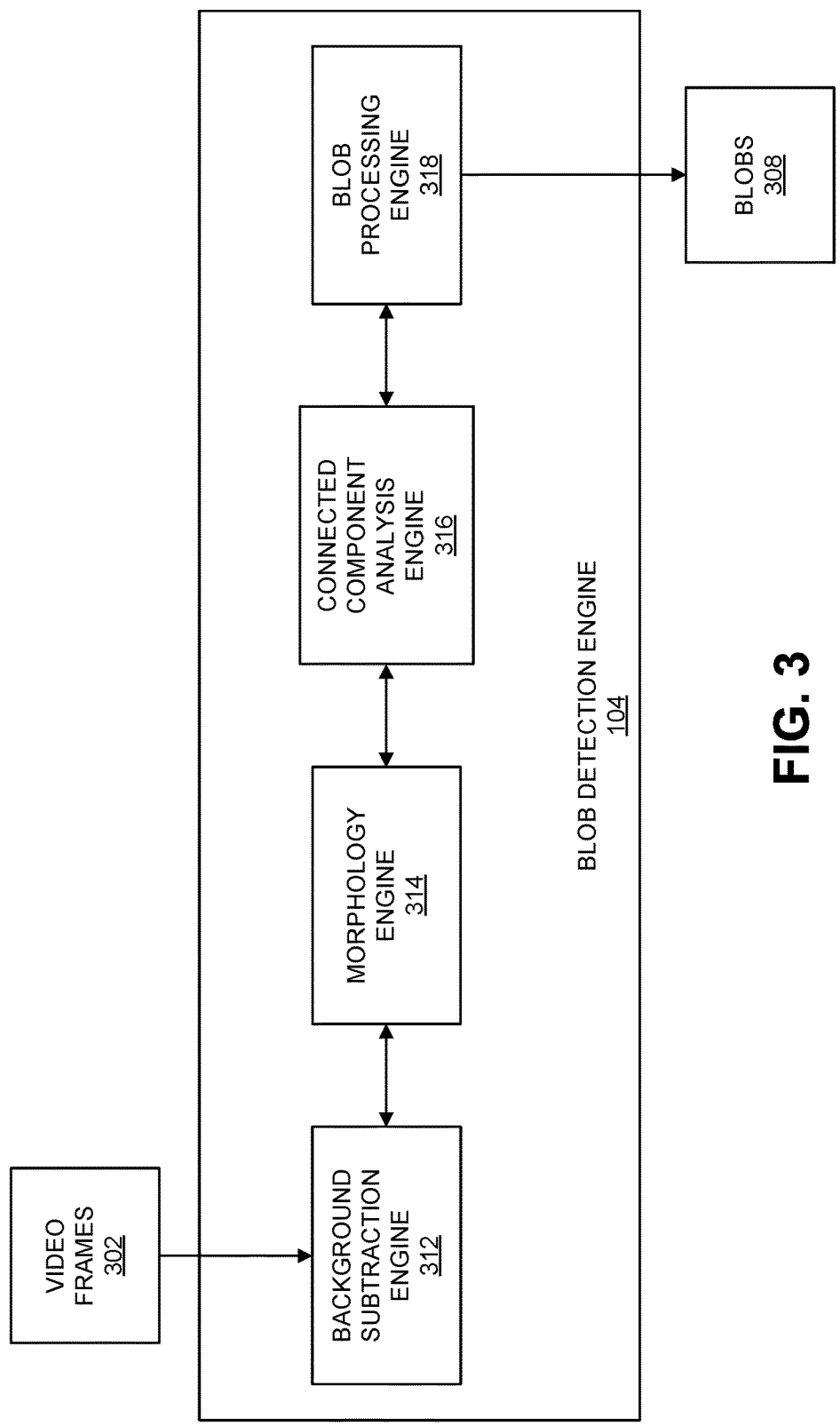
FIG. 3 is a block diagram illustrating an example of a blob detection engine, in accordance with some embodiments.

FIG. 3 is a block diagram illustrating an example of a blob detection engine 104. Blob detection is used to segment moving objects from the global background in a scene. The blob detection engine 104 includes a background subtraction engine 312 that receives video frames 302. The background subtraction engine 312 can perform background subtraction to detect foreground pixels in one or more of the video frames 302. For example, the background subtraction can be used to segment moving objects from the global background in a video sequence and to generate a foreground-background binary mask (referred to herein as a foreground mask). In some examples, the background subtraction can perform a subtraction between a current frame or picture and a background model including the background part of a scene (e.g., the static or mostly static part of the scene). Based on the results of background subtraction, the morphology engine 314 and connected component analysis engine 316 can perform foreground pixel processing to group the foreground pixels into foreground blobs for tracking purpose. For example, after background subtraction, morphology operations can be applied to remove noisy pixels as well as to smooth the foreground mask. Connected component analysis can then be applied to generate the blobs. Blob processing can then be performed, which may include further filtering out some blobs and merging together some blobs to provide bounding boxes as input for tracking.

The background subtraction engine 312 can model the background of a scene (e.g., captured in the video sequence) using any suitable background subtraction technique (also referred to as background extraction). One example of a background subtraction method used by the background subtraction engine 312 includes modeling the background of the scene as a statistical model based on the relatively static pixels in previous frames which are not considered to belong to any moving region. For example, the background subtraction engine 312 can use a Gaussian distribution model for each pixel location, with parameters of mean and variance to model each pixel location in frames of a video sequence. All the values of previous pixels at a particular pixel location are used to calculate the mean and variance of the target Gaussian model for the pixel location. When a pixel at a given location in a new video frame is processed, its value will be evaluated by the current Gaussian distribution of this pixel location. A classification of the pixel to either a foreground pixel or a background pixel is done by comparing the difference between the pixel value and the mean of the designated Gaussian model. In one illustrative example, if the distance of the pixel value and the Gaussian Mean is less than 3 times of the variance, the pixel is classified as a background pixel. Otherwise, in this illustrative example, the pixel is classified as a foreground pixel. At the same time, the Gaussian model for a pixel location will be updated by taking into consideration the current pixel value.

The background subtraction engine 312 can also perform background subtraction using a mixture of Gaussians (also referred to as a Gaussian mixture model (GMM)). A GMM models each pixel as a mixture of Gaussians and uses an online learning algorithm to update the model. Each Gaussian model is represented with mean, standard deviation (or covariance matrix if the pixel has multiple channels), and weight. Weight represents the probability that the Gaussian occurs in the past history.

$$P(X_t) = \sum_{i=1}^{K} \omega_{i,t} N\left(X_t \mid \mu_{i,t}, \sum_{i,t}\right)$$ Equation (1)

An equation of the GMM model is shown in equation (1), wherein there are K Gaussian models. Each Guassian model has a distribution with a mean of μ and variance of Σ, and has a weight ω. Here, i is the index to the Gaussian model and t is the time instance. As shown by the equation, the parameters of the GMM change over time after one frame (at time t) is processed.

The background subtraction techniques mentioned above are based on the assumption that the camera is mounted still, and if anytime the camera is moved or orientation of the camera is changed, a new background model will need to be calculated. There are also background subtraction methods that can handle foreground subtraction based on a moving background, including techniques such as tracking key points, optical flow, saliency, and other motion estimation based approaches.

The background subtraction engine 312 can generate a foreground mask with foreground pixels based on the result of background subtraction. For example, the foreground mask can include a binary image containing the pixels making up the foreground objects (e.g., moving objects) in a scene and the pixels of the background. In some examples, the background of the foreground mask (background pixels) can be a solid color, such as a solid white background, a solid black background, or other solid color. In such examples, the foreground pixels of the foreground mask can be a different color than that used for the background pixels, such as a solid black color, a solid white color, or other solid color. In one illustrative example, the background pixels can be black (e.g., pixel color value 0 in 8-bit grayscale or other suitable value) and the foreground pixels can be white (e.g., pixel color value 255 in 8-bit grayscale or other suitable value). In another illustrative example, the background pixels can be white and the foreground pixels can be black.

Using the foreground mask generated from background subtraction, a morphology engine 314 can perform morphology functions to filter the foreground pixels. The morphology functions can include erosion and dilation functions. In one example, an erosion function can be applied, followed by a series of one or more dilation functions. An erosion function can be applied to remove pixels on object boundaries. For example, the morphology engine 314 can apply an erosion function (e.g., FilterErode3×3) to a 3×3 filter window of a center pixel, which is currently being processed. The 3×3 window can be applied to each foreground pixel (as the center pixel) in the foreground mask. One of ordinary skill in the art will appreciate that other window sizes can be used other than a 3×3 window. The erosion function can include an erosion operation that sets a current foreground pixel in the foreground mask (acting as the center pixel) to a background pixel if one or more of its neighboring pixels within the 3×3 window are background pixels. Such an erosion operation can be referred to as a strong erosion operation or a single-neighbor erosion operation. Here, the neighboring pixels of the current center pixel include the eight pixels in the 3×3 window, with the ninth pixel being the current center pixel.

A dilation operation can be used to enhance the boundary of a foreground object. For example, the morphology engine 314 can apply a dilation function (e.g., FilterDilate3×3) to a 3×3 filter window of a center pixel. The 3×3 dilation window can be applied to each background pixel (as the center pixel) in the foreground mask. One of ordinary skill in the art will appreciate that other window sizes can be used other than a 3×3 window. The dilation function can include a dilation operation that sets a current background pixel in the foreground mask (acting as the center pixel) as a foreground pixel if one or more of its neighboring pixels in the 3×3 window are foreground pixels. The neighboring pixels of the current center pixel include the eight pixels in the 3×3 window, with the ninth pixel being the current center pixel. In some examples, multiple dilation functions can be applied after an erosion function is applied. In one illustrative example, three function calls of dilation of 3×3 window size can be applied to the foreground mask before it is sent to the connected component analysis engine 316. In some examples, an erosion function can be applied first to remove noise pixels, and a series of dilation functions can then be applied to refine the foreground pixels. In one illustrative example, one erosion function with 3×3 window size is called first, and three function calls of dilation of 3×3 window size are applied to the foreground mask before it is sent to the connected component analysis engine 316. Details regarding content-adaptive morphology operations are described below.

After the morphology operations are performed, the connected component analysis engine 316 can apply connected component analysis to connect neighboring foreground pixels to formulate connected components and blobs. One example of the connected component analysis performed by the connected component analysis engine 316 is implemented as follows:

```
for each pixel of the foreground mask {
  if it is a foreground pixel and has not been processed, the following steps apply:
    Apply FloodFill function to connect this pixel to other foreground
    and generate a connected component
    Insert the connected component in a list of connected components.
    Mark the pixels in the connected component as being processed }
```

The Floodfill (seed fill) function is an algorithm that determines the area connected to a seed node in a multi-dimensional array (e.g., a 2-D image in this case). This Floodfill function first obtains the color or intensity value at the seed position (e.g., a foreground pixel) of the source foreground mask, and then finds all the neighbor pixels that have the same (or similar) value based on 4 or 8 connectivity. For example, in a 4 connectivity case, a current pixel's neighbors are defined as those with a coordination being (x+d, y) or (x, y+d), wherein d is equal to 1 or −1 and (x, y) is the current pixel. One of ordinary skill in the art will appreciate that other amounts of connectivity can be used. Some objects are separated into different connected components and some objects are grouped into the same connected components (e.g., neighbor pixels with the same or similar values). Additional processing may be applied to further process the connected components for grouping. Finally, the blobs 308 are generated that include neighboring foreground pixels according to the connected components. In one example, a blob can be made up of one connected component. In another example, a blob can include multiple connected components (e.g., when two or more blobs are merged together).

The blob processing engine 318 can perform additional processing to further process the blobs generated by the connected component analysis engine 316. In some examples, the blob processing engine 318 can generate the bounding boxes to represent the detected blobs and blob trackers. In some cases, the blob bounding boxes can be output from the blob detection engine 104. In some examples, the blob processing engine 318 can perform content-based filtering of certain blobs. For instance, a machine learning method can determine that a current blob contains noise (e.g., foliage in a scene). Using the machine learning information, the blob processing engine 318 can determine the current blob is a noisy blob and can remove it from the resulting blobs that are provided to the object tracking engine 106. In some examples, the blob processing engine 318 can merge close blobs into one big blob to remove the risk of having too many small blobs that could belong to one object. In some examples, the blob processing engine 318 can filter out one or more small blobs that are below a certain size threshold (e.g., an area of a bounding box surrounding a blob is below an area threshold). In some embodiments, the blob detection engine 104 does not include the blob processing engine 318, or does not use the blob processing engine 318 in some instances. For example, the blobs generated by the connected component analysis engine 316, without further processing, can be input to the object tracking engine 106 to perform blob and/or object tracking.

Figure 4:
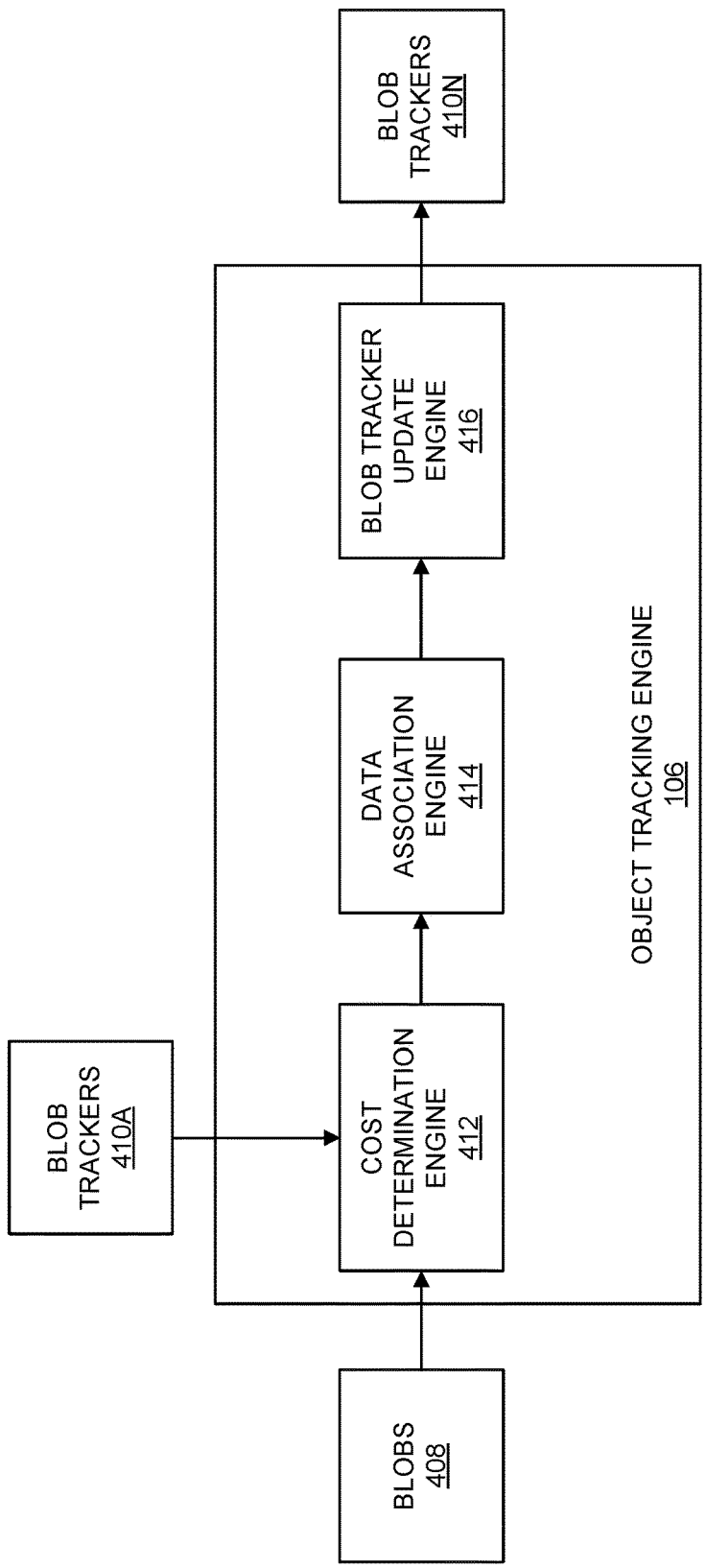
FIG. 4 is a block diagram illustrating an example of an object tracking engine, in accordance with some embodiments.

FIG. 4 is a block diagram illustrating an example of an object tracking engine 106. Object tracking in a video sequence can be used for many applications, including surveillance applications, among many others. For example, the ability to detect and track multiple objects in the same scene is of great interest in many security applications. When blobs (making up at least portions of objects) are detected from an input video frame, blob trackers from the previous video frame need to be associated to the blobs in the input video frame according to a cost calculation. The blob trackers can be updated based on the associated foreground blobs. In some instances, the steps in object tracking can be conducted in a series manner.

A cost determination engine 412 of the object tracking engine 106 can obtain the blobs 408 of a current video frame from the blob detection engine 104. The cost determination engine 412 can also obtain the blob trackers 410A updated from the previous video frame (e.g., video frame A 202A). A cost function can then be used to calculate costs between the blob trackers 410A and the blobs 408. Any suitable cost function can be used to calculate the costs. In some examples, the cost determination engine 412 can measure the cost between a blob tracker and a blob by calculating the Euclidean distance between the centroid of the tracker (e.g., the bounding box for the tracker) and the centroid of the bounding box of the foreground blob. In one illustrative example using a 2-D video sequence, this type of cost function is calculated as below:

$$Cost_{tb} = \sqrt{(t_x - b_x)^2 + (t_y - b_y)^2}$$

The terms $(t_x, t_y)$ and $(b_x, b_y)$ are the center locations of the blob tracker and blob bounding boxes, respectively. As noted herein, in some examples, the bounding box of the blob tracker can be the bounding box of a blob associated with the blob tracker in a previous frame. In some examples, other cost function approaches can be performed that use a minimum distance in an x-direction or y-direction to calculate the cost. Such techniques can be good for certain controlled scenarios, such as well-aligned lane conveying. In some examples, a cost function can be based on a distance of a blob tracker and a blob, where instead of using the center position of the bounding boxes of blob and tracker to calculate distance, the boundaries of the bounding boxes are considered so that a negative distance is introduced when two bounding boxes are overlapped geometrically. In addition, the value of such a distance is further adjusted according to the size ratio of the two associated bounding boxes. For example, a cost can be weighted based on a ratio between the area of the blob tracker bounding box and the area of the blob bounding box (e.g., by multiplying the determined distance by the ratio).

In some embodiments, a cost is determined for each tracker-blob pair between each tracker and each blob. For example, if there are three trackers, including tracker A, tracker B, and tracker C, and three blobs, including blob A, blob B, and blob C, a separate cost between tracker A and each of the blobs A, B, and C can be determined, as well as separate costs between trackers B and C and each of the blobs A, B, and C. In some examples, the costs can be arranged in a cost matrix, which can be used for data association. For example, the cost matrix can be a 2-dimensional matrix, with one dimension being the blob trackers 410A and the second dimension being the blobs 408. Every tracker-blob pair or combination between the trackers 410A and the blobs 408 includes a cost that is included in the cost matrix. Best matches between the trackers 410A and blobs 408 can be determined by identifying the lowest cost tracker-blob pairs in the matrix. For example, the lowest cost between tracker A and the blobs A, B, and C is used to determine the blob with which to associate the tracker A.

Data association between trackers 410A and blobs 408, as well as updating of the trackers 410A, may be based on the determined costs. The data association engine 414 matches or assigns a tracker with a corresponding blob and vice versa. For example, as described previously, the lowest cost tracker-blob pairs may be used by the data association engine 414 to associate the blob trackers 410A with the blobs 408. Another technique for associating blob trackers with blobs includes the Hungarian method, which is a combinatorial optimization algorithm that solves such an assignment problem in polynomial time and that anticipated later primal-dual methods. For example, the Hungarian method can optimize a global cost across all blob trackers 410A with the blobs 408 in order to minimize the global cost. The blob tracker-blob combinations in the cost matrix that minimize the global cost can be determined and used as the association.

In addition to the Hungarian method, other robust methods can be used to perform data association between blobs and blob trackers. For example, the association problem can be solved with additional constraints to make the solution more robust to noise while matching as many trackers and blobs as possible.

Regardless of the association technique that is used, the data association engine 414 can rely on the distance between the blobs and trackers. The location of the foreground blobs are identified with the blob detection engine 104. However, a blob tracker location in a current frame may need to be predicted from a previous frame (e.g., using a location of a blob associated with the blob tracker in the previous frame). The calculated distance between the identified blobs and estimated trackers is used for data association. After the data association for the current frame, the tracker location in the current frame can be identified with the location of its associated blob(s) in the current frame. The tracker's location can be further used to update the tracker's motion model and predict its location in the next frame.

Once the association between the blob trackers 410A and blobs 408 has been completed, the blob tracker update engine 416 can use the information of the associated blobs, as well as the trackers' temporal statuses, to update the states of the trackers 410A for the current frame. Upon updating the trackers 410A, the blob tracker update engine 416 can perform object tracking using the updated trackers 410N, and can also provide the update trackers 410N for use for a next frame.

The state of a blob tracker can include the tracker's identified location (or actual location) in a current frame and its predicted location in the next frame. The state can also, or alternatively, include a tracker's temporal status. The temporal status can include whether the tracker is a new tracker that was not present before the current frame, whether the tracker has been alive for certain frames, or other suitable temporal status. Other states can include, additionally or alternatively, whether the tracker is considered as lost when it does not associate with any foreground blob in the current frame, whether the tracker is considered as a dead tracker if it fails to associate with any blobs for a certain number of consecutive frames (e.g., 2 or more), or other suitable tracker states.

Other than the location of a tracker, there may be other status information needed for updating the tracker, which may require a state machine for object tracking. Given the information of the associated blob(s) and the tracker's own status history table, the status also needs to be updated. The state machine collects all the necessary information and updates the status accordingly. Various statuses can be updated. For example, other than a tracker's life status (e.g., new, lost, dead, or other suitable life status), the tracker's association confidence and relationship with other trackers can also be updated. Taking one example of the tracker relationship, when two objects (e.g., persons, vehicles, or other objects of interest) intersect, the two trackers associated with the two objects will be merged together for certain frames, and the merge or occlusion status needs to be recorded for high level video analytics.

One method for performing a tracker location update is using a Kalman filter. The Kalman filter is a framework that includes two steps. The first step is to predict a tracker's state, and the second step is to use measurements to correct or update the state. In this case, the tracker from the last frame predicts (using the blob tracker update engine 416) its location in the current frame, and when the current frame is received, the tracker first uses the measurement of the blob(s) to correct its location states and then predicts its location in the next frame. For example, a blob tracker can employ a Kalman filter to measure its trajectory as well as predict its future location(s). The Kalman filter relies on the measurement of the associated blob(s) to correct the motion model for the blob tracker and to predict the location of the object tracker in the next frame. In some examples, if a blob tracker is associated with a blob in a current frame, the location of the blob is directly used to correct the blob tracker's motion model in the Kalman filter. In some examples, if a blob tracker is not associated with any blob in a current frame, the blob tracker's location in the current frame is identified as its predicted location from the previous frame, meaning that the motion model for the blob tracker is not corrected and the prediction propagates with the blob tracker's last model (from the previous frame).

Regardless of the tracking method being used, a new tracker starts to be associated with a blob in one frame and, moving forward, the new tracker may be connected with possibly moving blobs across multiple frames. When a tracker has been continuously associated with blobs and a duration has passed, the tracker may be promoted to be a normal tracker and output as an identified tracker-blob pair. A tracker-blob pair is output at the system level as an event (e.g., presented as a tracked object on a display, output as an alert, or other suitable event) when the tracker is promoted to be a normal tracker. In some implementations, a normal tracker (e.g., including certain status data of the normal tracker, the motion model for the normal tracker, or other information related to the normal tracker) can be output as part of object metadata. The metadata, including the normal tracker, can be output from the video analytics system (e.g., an IP camera running the video analytics system) to a server or other system storage. The metadata can then be analyzed for event detection (e.g., by rule interpreter). A tracker that is not promoted as a normal tracker can be removed (or killed), after which the tracker can be considered as dead.

As described above, foreground blobs of a current frame can be generated from the processing of blob detection. After blob detection, foreground blobs can be used for temporal tracking. For example, the cost (e.g., a distance) between the blob trackers and blobs can be calculated, and data association can be performed to associate the trackers and blobs using the calculated costs (e.g., using a cost matrix). The blob trackers can then be updated according to the data association, in which case the updated state and location can be calculated and the tracking of the current frame can be fulfilled. As previously described, an example of a simple location update strategy includes, when a blob tracker is associated with one blob, directly using the location of the blob as the location of the blob tracker, which can be used to update or correct the tracker's motion model (e.g., in the Kalman filter). If the tracker is not associated with any blob in the current frame, the simple location update strategy can identify the tracker's predicted location from the last frame as its location in the current frame as (meaning that the motion model is not corrected and the prediction propagates with its last model).

Figure 7A:
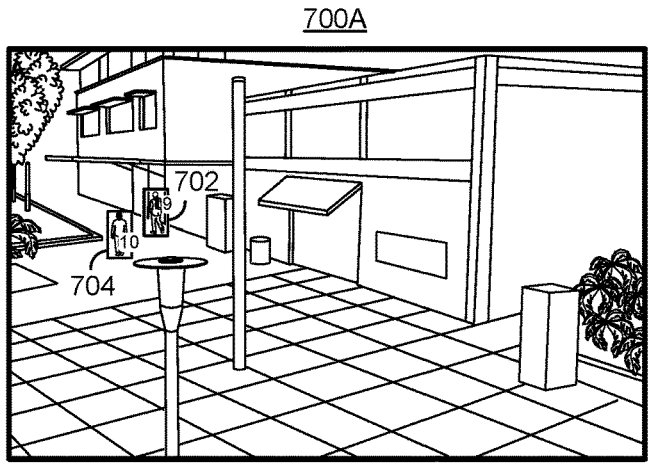
FIG. 7A is an illustration of a video frame of an environment in which various objects are tracked.
Figure 7B:
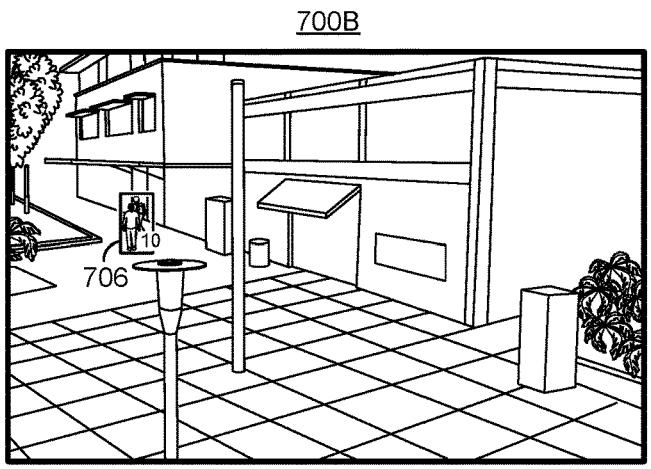
FIG. 7B is an illustration of another video frame with various objects being tracked.

In some cases, the simple tracker location update approach for object tracking may cause various problems. For example, in a realistic world, objects may intersect or group together, and in such cases, the blob detection engine 104 may detect one blob (a merged blob) that contains more than one object of interest (e.g., multiple objects that are being tracked). For example, as shown in FIG. 5A, two trackers (tracker T1 502 and tracker T2 504) are associated with one blob (blob B1 506). Both trackers T1 502 and T2 504 are associated with the single detected blob B1 506 due to the blob B1 506 being a union of two tracked objects (e.g., the objects with which trackers T1 502 and T2 504 were associated with in one or more previous frames). FIGS. 7A and 7B show an example of video frames 700A and 700B of an environment in which two objects are tracked, including person 702 and person 704. A blob detection engine can detect blobs for the two persons 702 and 704. In frame 700A, the person 702 is tracked using a blob tracker with identifier 9 (ID 9) and person 704 is tracked using a blob tracker with ID 10. As shown in frame 700B, as the person 702 comes closer to the person 704, the bounding boxes for the persons 702 and 704 become a merged bounding box 706 (corresponding to a merged blob, such as blob B1 506). The merged bounding box 706 is tracked with a single blob tracker with ID 10. In such a scenario, both bounding boxes with ID 9 and ID 10 are associated with a single merged blob (shown as bounding box 706 in FIG. 7B) that is generated for the persons 702 and 704. Because the blob B1 506 is the union of blobs for two tracked objects (e.g., person 702 and person 704), the size and location of the blob B1 506 may not be able to correctly represent the size and location of the tracked objects. In some cases, problems may arise if the merged blob is used to update both trackers T1 502 and T2 504. For example, the merged blob size and location may not correctly reflect the sizes and locations of the individual objects making up the merged blob. Hence, each of the trackers T1 502 and T2 504 may fail to track their respective associated objects (e.g., the blobs for person 702 and person 704 before the merge) in subsequent frames if they directly use the associated merged blob for motion correction and prediction for their respective motion model (e.g., in the Kalman filter).

Figure 6:
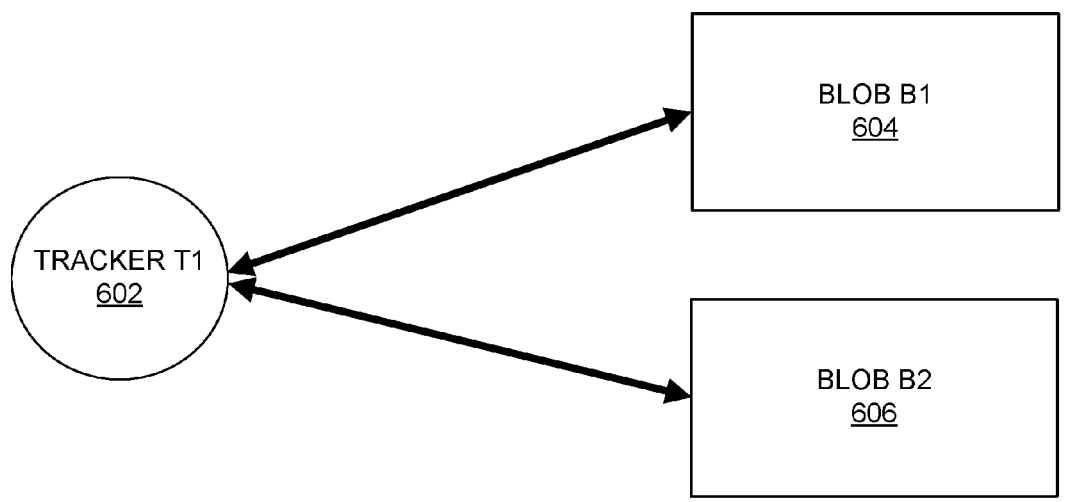
FIG. 6 is a diagram illustrating an example of a blob tracker being associated with multiple blobs, in accordance with some embodiments.
Figure 7C:
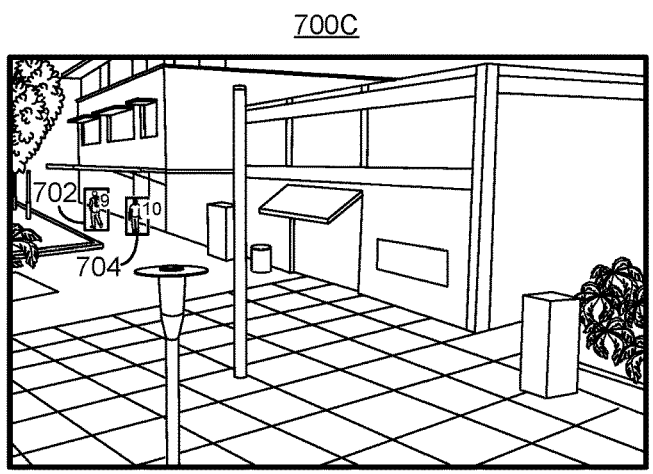
FIG. 7C is an illustration of another video frame with various objects being tracked.

Another problem arising from the use of the simple tracker location update approach is when a group of objects which are conveyed within one blob split from the blob at a certain time. For example, FIG. 6 shows an example of the split case, where blob B1 604 and blob B2 606 that were previously contained in a merged blob are split from the merged blob. When a split occurs, a tracker T1 602 can be associated by a data association engine with both blobs B1 604 and B2 606. FIGS. 7B and 7C show an example of video frames 700B and 700C in which the person 702 and the person 704 start to separate from one another as they walk through the environment. As the person 702 separates from the person 704, the blobs for the two persons 702 and 704 can split from the merged blob, as shown in frame 700C. Once the split occurs, the person 702 is again tracked using the blob tracker with ID 9 and person 704 is again tracked using a blob tracker with ID 10, as shown in frame 700C. When a split occurs, the objects that are split may start to have different trajectories. In addition, the blob sizes may change dramatically when the split occurs. Such changes in trajectory and size for blobs in a given frame may not be good for updating the original motion models for the blobs (e.g., conveyed by the original Kalman filters for the blobs), and thus a gradual change in the motion models for the blobs may fail to follow the object in subsequent frames (e.g., such change may fail the motion model of the Kalman filter).

Figure 8A:
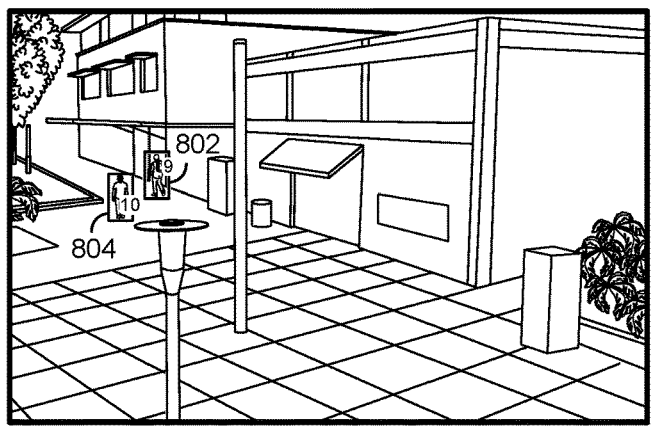
FIG. 8A is an illustration of a video frame of an environment in which various objects are tracked.
Figure 8B:
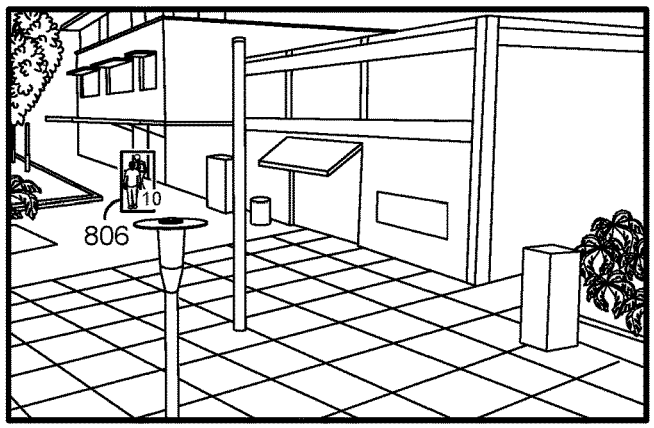
FIG. 8B is an illustration of another video frame with various objects being tracked.
Figure 8C:
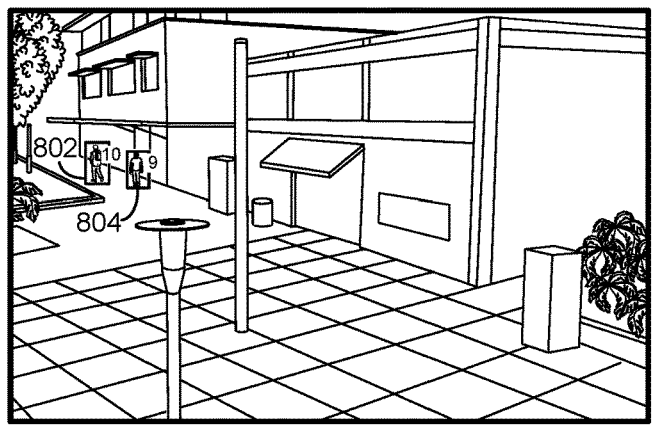
FIG. 8C is an illustration of another video frame with various objects being tracked.

Another problem that can arise due to use of the simple location update approach is a switch in identifiers (ID) assigned to blob trackers (referred to as ID switch). For example, when split occurs, the confusion of the original motion model (e.g., due to changes in trajectory and size for the split blobs) may cause errors in blob-tracker association, which can lead to an ID switch. ID switch occurs when two or more tracked objects have their tracking IDs interchanged with each other in a video sequences. For example, FIG. 8A, FIG. 8B, and FIG. 8C illustrate video frames 800A, 800B, and 800C of an environment in which two objects are tracked, including person 802 and person 804. A blob detection engine can detect blobs for the two persons 802 and 804. In frame 800A, the person 802 is tracked using a blob tracker with identifier 9 (ID 9) and person 804 is tracked using a blob tracker with ID 10. As shown in frame 800B, the bounding boxes for the persons 802 and 804 become a merged bounding box 806 (corresponding to a merged blob) as the person 802 comes closer to the person 804. The merged bounding box 806 is tracked with a single blob tracker with ID 10. As the person 802 separates from the person 804, the blobs for the two persons 802 and 804 split from the merged blob, as shown in frame 800C. Once the split occurs, the blob trackers tracking the persons 802 and 804 are switched, with the blob tracker with ID 9 now tracking the person 804 and the blob tracker with ID 10 tracking the person 802. While an ID switch can occur in many scenarios, it is more likely to take place when tracked objects merge together and separate after certain frames.

Systems and methods are described herein for performing context-aware motion model updates for blob trackers. In some examples, a context-aware motion model for a blob tracker associated with one or more blobs can be adaptively updated based on a status of the associated one or more blobs and/or based on a temporal status of the blob tracker. As described previously, the updated location of the tracker is critical for matching blobs and trackers in a video sequence. The context-aware motion model update systems and methods can be used for predicting a blob tracker location in a next frame, given its associated blob(s) in the current frame and other temporal information, such as a life status of the blob tracker (e.g., new, lost, dead, or other suitable life status). Accordingly, the tracker motion model update systems and methods described herein consider both the blobs associated with a blob tracker and the temporal status of the blob tracker. The proposed techniques may work independently or jointly to provide a more robust, while accurate, tracker location update. In some examples, the object tracking engine 106 can perform the context-aware motion model update methods described herein.

A motion model contains at least the prediction of the location of the tracker as well as its velocity. In addition, blobs are the detected/processed pixel groups in each frame and are represented in the spatial domain. In the temporal domain, an object tracker is associated with one or more corresponding blob(s) in each frame, and forms the trajectory of the tracked objects with the tracker's unique identification (ID).

In some examples, a motion model for a blob tracker can determine and maintain two locations of the blob tracker for each frame. For example, a first location for a blob tracker for a current frame can include a predicted location in the current frame. The first location is referred to herein as the predicted location. The predicted location of the blob tracker in the current frame includes a location in a previous frame of a blob with which the blob tracker was associated. Hence, the location of the blob associated with the blob tracker in the previous frame can be used as the predicted location of the blob tracker in the current frame. A second location for the blob tracker for the current frame can include a location in the current frame of a blob with which the tracker is associated in the current frame. The second location is referred to herein as the actual location. Accordingly, the location in the current frame of a blob associated with the blob tracker is used as the actual location of the blob tracker in the current frame. The actual location of the blob tracker in the current frame can be used as the predicted location of the blob tracker in a next frame. The location of the blobs can include the locations of the bounding boxes of the blobs. In some examples, as described in more detail below, a Kalman filter is used to predict a next location of the tracker based on the current observation of the tracker's location in a current frame.

The velocity of a blob tracker can include the displacement of a blob tracker between consecutive frames. For example, the displacement can be determined between the centers (or centroids) of two bounding boxes for the blob tracker in two consecutive frames. In one illustrative example, the velocity of a blob tracker can be defined as $V_t = C_t - C_{t-1}$, where $C_t - C_{t-1} = (C_{tx} - C_{t-1x}, C_{ty} - C_{t-1y})$. The term $C_t(C_{tx}, C_{ty})$ denotes the center position of a bounding box of the tracker in a current frame, with $C_{tx}$ being the x-coordinate of the bounding box, and $C_{ty}$ being the y-coordinate of the bounding box. The term $C_{t-1}(C_{t-1x}, C_{t-1y})$ denotes the center position (x and y) of a bounding box of the tracker in a previous frame. In some implementations, it is also possible to use four parameters to estimate x, y, width, height at the same time. In some cases, because the timing for video frame data is constant or at least not dramatically different overtime (according to the frame rate, such as 30 frames per second, 60 frames per second, 120 frames per second, or other suitable frame rate), a time variable may not be needed in the velocity calculation. In some cases, a time constant can be used (according to the instant frame rate) and/or a timestamp can be used. As noted above, a Kalman filter is used in some examples to predict a next location of the tracker (in a next frame) based on the tracker's currently observed location in a current frame. In some cases, the velocity of the tracker (and its associated blob/object) can be updated using the Kalman filter. For example, the (x,y) coordinates of the center of the tracker are used as parameters to be predicted. In some cases, the width and height of the tracker (and associated blob/object) are not predicted, in which case the width and height are copied from the information of the blob matched with the tracker in the previous frame.

The object tracking engine 106 can update the context-aware motion models for blob trackers based on an association status of the blob trackers with respect to blobs in a current frame with which the blob trackers are associated. For example, the association status of a blob tracker can include the tracker being associated (or matched) with a single blob in a current frame during data association, the tracker not being associated with any blobs in the current frame, multiple trackers, including the tracker, being associated with a single blob in the current frame (a blob merge scenario), the tracker being associated with multiple blobs in the current frame (a blob split scenario), or other suitable association status.

In cases in which one blob tracker is matched with one blob during data association for a current frame, the blob tracker can directly use its associated blob to update its motion model for the current frame. For example, the location of the blob tracker in the current frame can be updated from the predicted location to the location of the blob in the current frame, which can then be assigned as the blob tracker's actual location in the tracker's motion model. In some cases, the actual location of the blob tracker in the current frame can be used as the predicted location of the blob tracker in a next frame. In some examples, the motion model can be maintained by a Kalman filter, and the location of the blob can be utilized to update the Kalman filter, and then to predict the tracker's location in the next frame. In some examples, the location and the size of the blob can be utilized to update the Kalman filter and to predict the tracker's location in the next frame. For example, the size of the blob can be used as a weight on determined costs between the blob tracker and blobs in the next frame, as previously described. In one illustrative example, a cost between the blob tracker and a blob in the next frame can be weighted by a ratio value (e.g., by multiplying a determined distance by the ratio value). The ratio value can include a ratio between the area of the blob tracker bounding box and the area of the blob bounding box.

In some cases, a blob tracker is not matched with any detected blob in a current frame. In such cases, the tracker can keep the original motion model prior to the current frame. For example, the object tracking engine 106 can make no correction to the blob tracker's motion model, and can calculate the predicted location of the blob tracker for the next frame using the original motion model. No correction is made to the motion model because there is no associated blob in the current frame for the blob tracker. The predicted location of the blob tracker in the current frame (including the location of the tracker's associated blob in a previous frame) can thus be maintained and not updated to an actual location, in which case the predicted location for the blob tracker in the current frame can be used as the predicted location of the blob tracker for the next frame.

Figure 5:
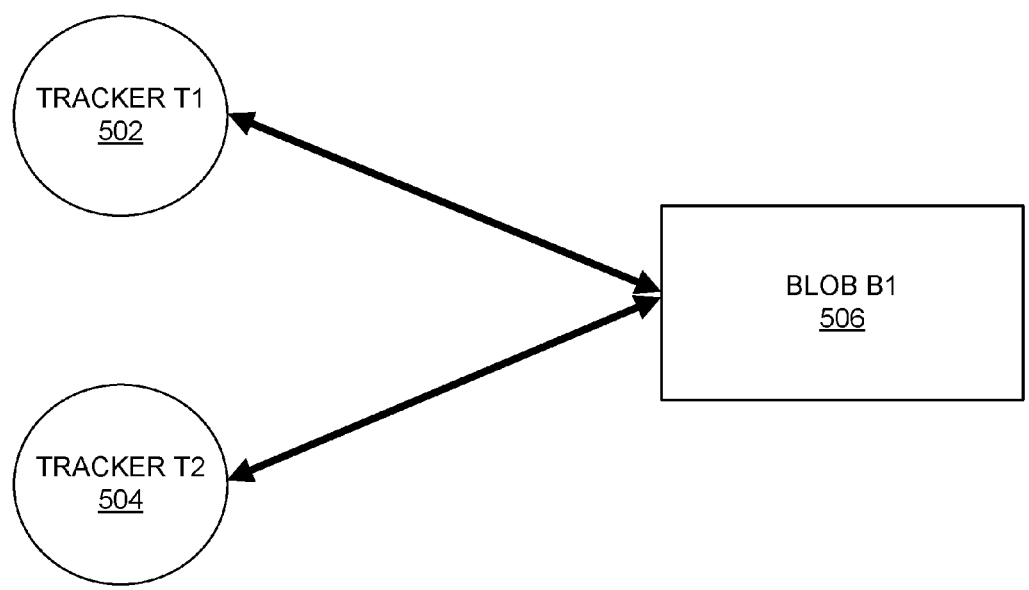
FIG. 5 is a diagram illustrating an example of multiple blob trackers being associated with a blob, in accordance with some embodiments.

When the object tracking engine 106 detects that multiple blob trackers are associated with a single blob in the current frame, and needs to update the motion models of the blob trackers, it can consider temporal information, such as tracker matching status. For example, in a blob merge scenario (as illustrated in FIG. 5), a blob tracker that is considered to be merged (based on its associated blob from one or more previous frames being merged with one or more other blobs) may not directly utilize its associated blob in the current frame to update its motion model for the current frame. Instead, the object tracking engine 106 can update the motion model for the blob tracker with previously obtained parameters of the motion model (e.g., parameters of the Kalman filter) before merging occurred. For example, instead of using the merged blob to update the location of the blob tracker, the predicted location of the blob tracker in the current frame (the location of an associated blob in a previous frame) can be used as the actual location of the blob tracker in the current frame. One reason for updating the motion model for the blob tracker with previously obtained parameters is that the associated blob is the union of multiple tracked objects (a merged blob), and thus the location and size of the merged blob may fail to represent the individual trackers and can cause errors in Kalman filter-based motion prediction (or other forms of motion prediction). In one illustrative example of a merge scenario, when two blobs in a current frame are merged into a merged blob, resulting in the two trackers previously associated with the two blobs being associated with the merged blob, the predicted location (from the blob location in the previous frame) of the blob tracker can be considered as the actual location of the blob tracker for the current frame. The actual location of the blob tracker in the current frame (which is the predicted location in this scenario) can then be used as the predicted location of the blob tracker in a next frame.

When trackers are split in the current frame (as shown in FIG. 6), the original individual blobs (e.g., blobs generated for the persons 702 and 704 in FIG. 7A) that make up the group of tracked objects leading to a merged blob may not be suitable for use in the motion models for the trackers associated with the original blobs. In cases in which a split occurs and a blob tracker is associated with two or more blobs, the parameters of the motion model for the blob tracker can be reset. In some cases, resetting the parameters of the motion model includes eliminating from the motion model the locations previously determined for the blob tracker. In some cases, resetting the parameters of the motion model also includes eliminating all the previous trajectories as well as blob sizes for calculating the motion model. After the parameters are reset, a newly associated blob matched with the blob tracker can be used to initialize a new motion model for the blob tracker, including new locations and, in some cases, new trajectory and size information.

In examples in which a motion model for an object tracker is maintained by a Kalman filter, other parameters of the Kalman filter can also be adaptive to the temporal information instead of being constant. For example, an update rate in a Kalman filter for a blob tracker that has been active for a certain amount of time (e.g., more than a threshold number of frames, such as 10, 20, 30, 45, 60, or other suitable number) may be set to a larger rate than that of a tracker being newly created. The update rate in a Kalman filter is related to the update period of the Kalman filter. For example, if the period at which the Kalman filter is updated is small, the change to the current position will also be small. Similarly, if the period is large, the change to the current position will also be large. The update rate can be considered as a factor of Kalman gain. The update parameter is a parameter that can be initialized when a kalman filter is initialized. Increasing the update rate makes it possible to quickly follow the blob tracker's trajectory. In some cases, the update rate can later be decreased so that the update becomes more smooth. This change is also context-aware by considering the tracker's temporal states.

In some examples, the context-aware motion model update method can include a 2-step implementation for each blob tracker for a current frame. For example, the first step can include obtaining temporal state information for a blob tracker and its associated blob information (e.g., size of the blob, location of the blob, or other information). In some examples, temporal state information can include a time the tracker has been in its current state (e.g., the state and the time the tracker has been in this state). The temporal and associated blob information can be acquired for all blob trackers after data association is performed for the current frame. The second step can include updating the motion models for the blob trackers.

The motion model updates of the second step can be performed as described above. For example, for trackers that have 1-to-1 match with a blob (1 tracker, 1 blob), the motion model can be updated by directly using the matched (or associated) blob. For trackers that have no matching blob in the current frame, the motion model is not updated in the current frame and the prediction can propagate with the previous model.

For trackers that have a multi-to-1 match (multiple trackers-to-1 blob), which is considered a merge case, the trackers can be updated without motion model updates (e.g., the associated merged blob is not used to update the motion model). In some cases, the size information in the motion model (e.g., the Kalman filter) does not change and the motion prediction propagates without using information of the associated blob (the merged blob). In some examples, the associated blob (merged blob) can be used to provide constraints for the tracker update. For example, sometimes the predicted location of a tracker can be out of the detected blob since the model is not updated with measurement any more. A constraint can be used to limit the predicted location to always be in the detected blob area.

For trackers that are split, the motion models (e.g., in Kalman filter) for the corresponding blob trackers can be reset. For example, the original motion model for a split blob tracker can be eliminated and the latest blobs associated with the blob tracker (e.g., one or more blobs associated with the blob tracker after the split) can be used to initialize a new motion model for the blob tracker (e.g., for the blob tracker's Kalman filter).

The context-aware motion model update methods and systems described herein can be evaluated in an end-to-end IP camera system, in which case the blob/object detection rate and the blob/object tracking rate are two important numbers compared with ground truth. In addition, it is noted that the proposed method can address the problem of ID switch by updating the motion model with a more robust mechanism. Results of one illustrative test set are shown below in Table 1.

TABLE 1

| Test Sequence ID | Context-Aware Update Method | | | Simple Update Method | | |
|---|---|---|---|---|---|---|
| | Detection rate | Tracking rate | ID switch | Detection rate | Tracking rate | ID switch |
| 1 | 0.2714 | 0.4325 | 15 | 0.2593 | 0.412 | 59 |
| 2 | 0.3938 | 0.638 | 18 | 0.3919 | 0.6339 | 26 |
| 3 | 0.4618 | 0.7202 | 3 | 0.4469 | 0.6914 | 6 |
| 4 | 0.4023 | 0.6178 | 24 | 0.3683 | 0.558 | 95 |

TABLE 1-continued

|  | Context-Aware Update Method | | | Simple Update Method | | |
| --- | --- | --- | --- | --- | --- | --- |
| Test Sequence ID | Detection rate | Tracking rate | ID switch | Detection rate | Tracking rate | ID switch |
| Average Comparison | 0.3823 4.28% | 0.6021 4.93% | 15 67.74% | 0.3666 | 0.5738 | 46.5 |

As shown in Table 1, the tracking rate and detection rate are both improved. In addition, the ID switch has been dramatically decreased.

To emphasize the performance of the proposed method, comparisons between the proposed method and the simple method in the ID-switch case are illustrated in FIGS. 7A-7C, 8A-8C, 9A-9C, and 10A-10C. For example, FIG. 7A-FIG. 7C illustrate video frames 700A-700C for which the context-aware tracker update method is performed. Video frames 700A-700C capture an environment in which person 702 and person 704 are tracked. In frame 700A, the person 702 is tracked using a blob tracker with identifier 9 (ID 9) and person 704 is tracked using a blob tracker with ID 10. As shown in frame 700B, as the person 702 approaches the person 704, the bounding boxes for the persons 702 and 704 become a merged bounding box 706 (corresponding to a merged blob). The merged bounding box 706 is tracked with a single blob tracker with ID 10. When the merging occurs, both bounding boxes with ID 9 and ID 10 are associated with a single merged blob (shown as bounding box 706) that is generated for the persons 702 and 704.

In the frame 700C shown in FIG. 7C, the person 702 and the person 704 separate from one another as they walk through the environment. As the person 702 separates from the person 704, the blobs for the two persons 702 and 704 can split from the merged blob. Once the split occurs, the person 702 is again tracked using the blob tracker with ID 9 and person 704 is again tracked using the blob tracker with ID 10, as shown in frame 700C. Using the described context-aware motion model update, the person 702 continues to be tracked by the correct blob tracker (with ID 9) and the person 704 continues to be tracked by the blob tracker with ID 9.

FIG. 8A-FIG. 8C illustrate frames 800A-800C that capture a similar scene as that captured in video frames 700A-700C, but for which the simple location update strategy is used. For example, in video frame 800A, the person 802 is tracked using a blob tracker with ID 9 and the person 804 is tracked using a blob tracker with ID 10. The bounding boxes for the persons 802 and 804 become a merged bounding box 806 in video frame 800B. The merged bounding box 806 is tracked with a single blob tracker with ID 10. When the person 802 and the person 804 separate from one another, the blobs for the two persons 802 and 804 can split from the merged blob. As shown in video frame 800C when the split occurs, the person 802 is now tracked using the blob tracker with ID 10 and person 804 is now tracked using the blob tracker with ID 9. As can be seen, the simple location update strategy causes an ID switch to occur, leading to the blob trackers tracking the persons 802 and 804 being switched.

Figure 9A:
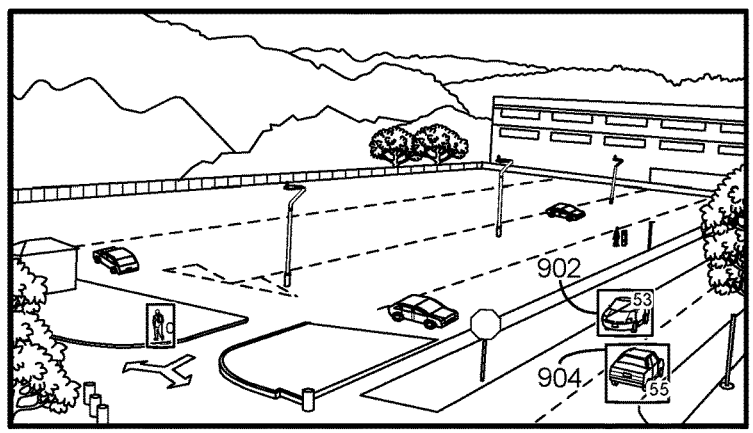
FIG. 9A is an illustration of a video frame of an environment in which various objects are tracked.
Figure 9B:
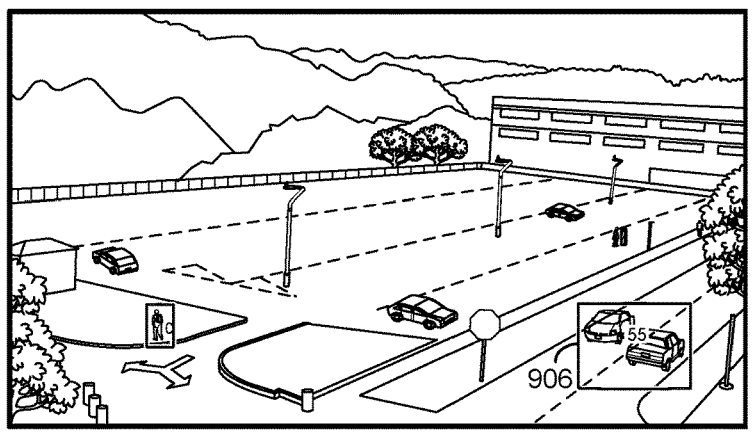
FIG. 9B is an illustration of another video frame with various objects being tracked.
Figure 9C:
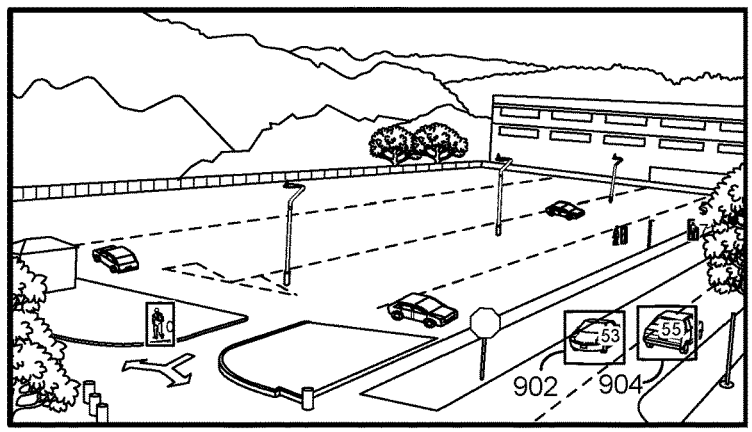
FIG. 9C is an illustration of another video frame with various objects being tracked.

FIG. 9A-FIG. 9C illustrate another example of video frames 900A-900C for which the context-aware tracker update method is performed. Video frames 900A-900C capture an environment in which a car 902 and a car 904 are tracked. In frame 900A, the car 902 is tracked using a blob tracker with ID 53 and the car 904 is tracked using a blob tracker with ID 55. As the cars 902 and 904 approach one another and cross paths (as shown in frame 900B), the bounding boxes for the cars 902 and 904 become a merged bounding box 906 (corresponding to a merged blob). The merged bounding box 906 is tracked with a single blob tracker with ID 55. When the merging occurs, both bounding boxes with ID 53 and ID 55 are associated with a single merged blob (shown as bounding box 906) that is generated for the cars 902 and 904.

The frame 900C of FIG. 9C shows the car 902 and the car 904 separating from one another as they travel down the road. As the car 902 separates from the car 904, the blobs for the two cars 902 and 904 can split from the merged blob. After the split, the car 902 is again tracked using the blob tracker with ID 53 and the car 904 is again tracked using the blob tracker with ID 55, as shown in frame 900C. The described context-aware motion model update thus prevents ID switch from occurring, so that the car 902 continues to be tracked by the blob tracker with ID 53 and the car 904 continues to be tracked by the blob tracker with ID 9.

Figure 10A:
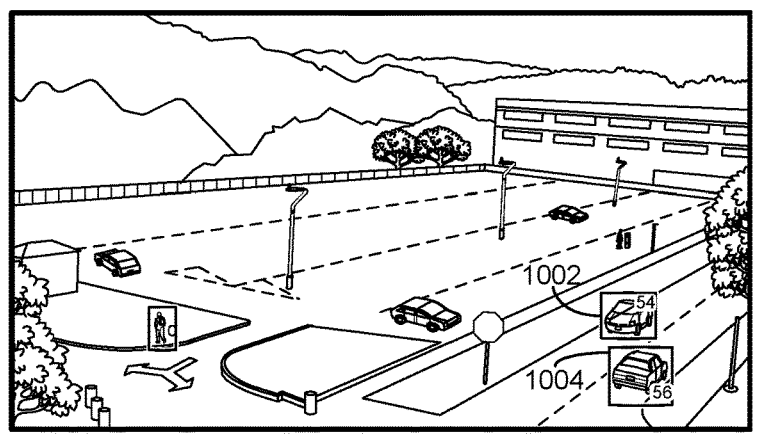
FIG. 10A is an illustration of a video frame of an environment in which various objects are tracked.
Figure 10B:
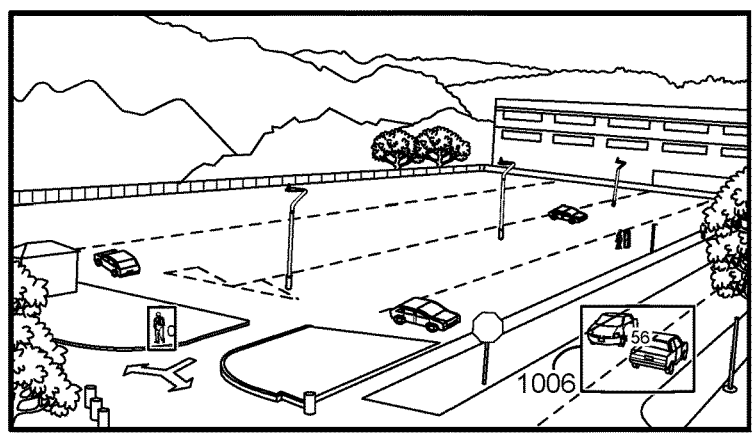
FIG. 10B is an illustration of another video frame with various objects being tracked.
Figure 10C:
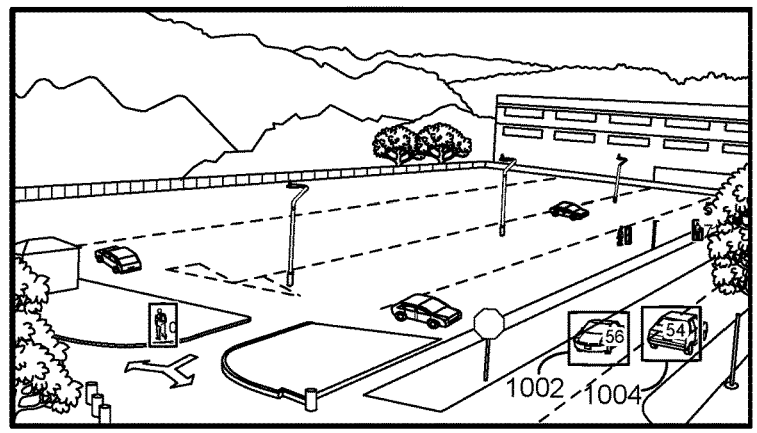
FIG. 10C is an illustration of another video frame with various objects being tracked.

FIG. 10A-FIG. 10C illustrate frames 1000A-1000C that capture a similar scene as that captured in video frames 900A-900C. However, the simple location update strategy is used to update the locations of trackers in frames 1000A-1000C. For example, in video frame 1000A, the car 1002 is tracked using a blob tracker with ID 54 and car 1004 is tracked using a blob tracker with ID 56. The bounding boxes for the cars 1002 and 1004 become a merged bounding box 1006 in video frame 1000B. The merged bounding box 1006 is tracked with a single blob tracker with ID 56. When the car 1002 and the car 1004 separate from one another, the blobs for the two cars 1002 and 1004 can split from the merged blob. As shown in video frame 1000C when the split occurs, the car 1002 is now tracked using the blob tracker with ID 56 and the car 1004 is now tracked using the blob tracker with ID 54. As can be seen, an ID switch occurs when the simple location update strategy is used, leading to the blob trackers tracking the cars 1002 and 1004 being switched.

Movement of objects causing merge and split scenarios can be common (e.g., in video surveillance use cases). It can be seen from the examples that the proposed method is robust in keeping the tracking ID corresponding to the objects when they merge and split.

FIG. 11 illustrates an example of a process 1100 of maintaining one or more motion models for one or more blob trackers using the context-adaptive or context-aware tracker update techniques described herein. At 1102, the process 1100 includes associating a first tracker and a second tracker with a merged blob of a current video frame. The merged blob includes pixels of at least a portion of one or more foreground objects in the current video frame. The merged blob includes a first blob merged with a second blob.

At 1104, the process 1100 includes updating a motion model of the first tracker to include a predicted location of the first tracker in a next video frame. The motion model is updated by using a previously predicted location of the first tracker as the predicted location of the first tracker in the next video frame in response to the first tracker being associated with the merged blob. The previously predicted location of the first tracker is determined using a blob location in a previous video frame. In some examples, the first tracker is associated with the first blob in the previous video frame, and the second tracker is associated with the second blob in the previous video frame. That is, before the current frame (in the previous frame), the first tracker was associated or matched with the first blob and the second tracker was associated or matched with the second blob. The association can be performed by a data association engine (e.g., data association engine 414) using the techniques described above.

In some examples, the blob location in the previous video frame includes a location of the first blob in the previous video frame before the first blob is merged with the second blob. In such examples, the previously predicted location of the tracker is determined using the blob location from the previous video frame before the first blob is merged with the second blob. For example, as described above, a motion model for a blob tracker can determine and maintain two locations of the blob tracker for each frame. A first location for a blob tracker for a current frame can include a predicted location in the current frame. The predicted location of the blob tracker in the current frame includes a location in a previous frame of a blob with which the blob tracker was associated. A second location for the blob tracker for the current frame can include a location in the current frame of a blob with which the tracker is currently associated in the current frame. In some cases, the second (or actual) location can be used to update or correct the predicted location, as previously described. However, due to the first tracker and the second tracker being associated with the merged blob (indicating a merge scenario), the previously predicted location of the tracker using the blob location from the previous frame is used as the actual location of the first tracker. The motion model for the first tracker is thus updated with the previously obtained parameters of the motion model that were present before merging occurred.

In some examples, the process 1100 further includes detecting a split of the merged blob in a subsequent video frame. The split includes the first blob splitting from the merged blob, and the subsequent video frame is obtained later in time than the current video frame. In such examples, the process 1100 further includes resetting the motion model of the first tracker in response to detecting the split of the first blob from the merged blob. In some cases, resetting the motion model includes eliminating from the motion model one or more previously determined locations for the first tracker. For instance, The motion model can be reset by eliminating the locations previously determined for the blob tracker from the motion model. In some cases, resetting the motion model can also include eliminating all the previous trajectories, blob sizes, or both trajectories and blob sizes for calculating the motion model. In some examples, the process 1100 further includes reinitializing the motion model for the first tracker using a location of a blob in the subsequent video frame, in which case the first tracker is associated with the blob in the subsequent video frame.

As previously noted, a motion model of a blob tracker can contain the prediction of the location of the tracker, and can also include its velocity (or position). In some examples, the motion model of the first tracker includes one or more locations of the first tracker, a velocity of the first tracker, and one or more sizes of one or more blobs associated with the first tracker. In some examples, the motion model of the first tracker is maintained using a Kalman filter.

FIG. 12 illustrates an example of another process 1200 of maintaining one or more motion models for one or more blob trackers using the context-adaptive or context-aware tracker update techniques described herein. At 1202, the process 1200 includes associating a first tracker with a first blob. The first blob includes pixels of at least a portion of one or more foreground objects in one or more video frames.

At 1204, the process 1200 includes detecting a split of the first blob and a second blob in a current video frame.

In some examples, the first blob and the second blob are merged into a merged blob in a previous video frame, in which case the previous video frame is obtained earlier in time than the current video frame. In such examples, the first tracker and a second tracker are associated with the merged blob in the previous video frame. For instance, in one illustrative example, as one person comes closer to another person, the blobs for the two people can be merged into a merged blob.

In some examples, the first blob and the second blob are not associated with a merged blob that includes previously separate blobs. For example, the first blob may be the only blob detected for an object in a previous frame. The first object may fragment or break in a subsequent frame received after the previous frame, causing multiple objects to be detected for the object, including the second blob. In one illustrative example, the object may be a log that is whole in a first frame, and that is broken into one or more pieces in a second frame. The first blob can be detected for the log in the first frame, and the first and second blobs may be detected in the second frame. One of ordinary skill will appreciate that an object can include any suitable item, such as a person, a vehicle, a building, an animal, or any other suitable object that can be detected in one or more video frames.

At 1206, the process 1200 includes resetting a motion model of the first tracker in response to detecting the split of the first blob and the second blob. In some cases, resetting the motion model includes eliminating from the motion model one or more previously determined locations for the first tracker. For instance, The motion model can be reset by eliminating the locations previously determined for the first tracker from the motion model. In some cases, resetting the motion model can also include eliminating all the previous trajectories, blob sizes, or both trajectories and blob sizes for calculating the motion model. In some examples, the process 1200 further includes reinitializing the motion model of the first tracker using a location of the first blob in the current video frame, in which case the first tracker is associated with the first blob in the current video frame.

In some examples, the process 1200 further includes associating a third tracker with a merged blob in the current video frame. The merged blob includes a third blob merged with a fourth blob. Multiple trackers are associated with the merged blob in the current video frame. In such examples, the process 1200 further includes updating a motion model of the third tracker to include a predicted location of the third tracker in a next video frame. The motion model is updated by using a previously predicted location of the third tracker as the predicted location of the third tracker in the next video frame in response to the third tracker being associated with the merged blob. The previously predicted location of the third tracker is determined using a blob location in a previous video frame. In some examples, the third tracker is associated with the third blob in the previous video frame, and a fourth tracker is associated with the fourth blob in the previous video frame. For instance, before the current frame (in one or more previous frames), the third tracker was associated or matched with the third blob and the fourth tracker was associated or matched with the fourth blob. The association can be performed by a data association engine (e.g., data association engine 414) using the techniques described above.

In some examples, the blob location in the previous video frame includes a location of the third blob in the previous video frame before the third blob is merged with the fourth blob. In such examples, the previously predicted location of the third tracker is determined using the blob location from the previous video frame before the third blob is merged with the fourth blob. For example, as previously described, a motion model for a blob tracker can determine and maintain two locations of the blob tracker for each frame. A first location for a blob tracker for a current frame can include a predicted location in the current frame, which includes a location in a previous frame of a blob with which the blob tracker was associated. A second location for the blob tracker for the current frame can include a location in the current frame of a blob with which the tracker is currently associated in the current frame. In some cases, the second (or actual) location can be used to update or correct the predicted location, as previously described. However, due to the third tracker and the fourth tracker being associated with the merged blob (indicating a merge scenario), the previously predicted location of the third tracker using the blob location from the previous frame is used as the actual location of the third tracker. The motion model for the third tracker is thus updated with the previously obtained parameters of the motion model that were present before the merging of the third and further blobs occurred.

As previously noted, a motion model of a blob tracker can contain the prediction of the location of the tracker, and can also include its velocity (or position). In some examples, the motion model of the first tracker includes at least one or more locations of the first tracker, a velocity of the first tracker, and one or more sizes of one or more blobs associated with the first tracker. In some examples, the motion model of the first tracker is maintained using a Kalman filter.

In some examples, the processes 1100 and 1200 may be performed by a computing device or an apparatus, such as the video analytics system 100. For example, the processes 1100 and 1200 can be performed by the video analytics system 100 and/or the object tracking engine 106 shown in FIG. 1 and FIG. 4. In some cases, the computing device or apparatus may include a processor, microprocessor, microcomputer, or other component of a device that is configured to carry out the steps of processes 1100 and 1200. In some examples, the computing device or apparatus may include a camera configured to capture video data (e.g., a video sequence) including video frames. For example, the computing device may include a camera device (e.g., an IP camera or other type of camera device) that may include a video codec. In some examples, a camera or other capture device that captures the video data is separate from the computing device, in which case the computing device receives the captured video data. The computing device may further include a network interface configured to communicate the video data. The network interface may be configured to communicate Internet Protocol (IP) based data.

Processes 1100 and 1200 are illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 1100 and 1200 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The content-adaptive tracker update operations discussed herein may be implemented using compressed video or using uncompressed video frames (before or after compression). An example video encoding and decoding system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of maintaining one or more motion models for one or more blob trackers, comprising:
    associating a first tracker with a first blob, the first blob including pixels of at least a portion of one or more foreground objects in one or more video frames;
    detecting a split of the first blob and a second blob in a current video frame; and
    resetting a motion model of the first tracker in response to detecting the split of the first blob and the second blob.

2. The method of claim 1, wherein resetting the motion model includes eliminating from the motion model one or more previously determined locations for the first tracker.

3. The method of claim 1, further comprising:
    reinitializing the motion model of the first tracker using a location of the first blob in the current video frame.

4. The method of claim 1, wherein the first blob and the second blob are merged into a merged blob in a previous video frame, the previous video frame being obtained earlier in time than the current video frame.

5. The method of claim 4, wherein the first tracker and a second tracker are associated with the merged blob in the previous video frame.

6. The method of claim 1, further comprising:
    associating a third tracker with a merged blob in the current video frame, the merged blob including a third blob merged with a fourth blob, and wherein multiple trackers are associated with the merged blob in the current video frame; and
    updating a motion model of the third tracker to include a predicted location of the third tracker in a next video frame, wherein the motion model is updated by using a previously predicted location of the third tracker as the predicted location of the third tracker in the next video frame in response to the third tracker being associated with the merged blob, the previously predicted location of the third tracker being determined using a blob location in a previous video frame.

7. The method of claim 6, wherein the third tracker is associated with the third blob in the previous video frame, and wherein a fourth tracker is associated with the fourth blob in the previous video frame.

8. The method of claim 6, wherein the blob location in the previous video frame includes a location of the third blob in the previous video frame before the third blob is merged with the fourth blob.

9. The method of claim 1, wherein the motion model of the first tracker is maintained using a Kalman filter.

10. The method of claim 1, wherein the motion model of the first tracker includes one or more locations of the first tracker, a velocity of the first tracker, and one or more sizes of one or more blobs associated with the first tracker.

11. An apparatus for maintaining one or more motion models for one or more blob trackers comprising:
    a memory configured to store video data; and
    a processor configured to:
        associate a first tracker with a first blob, the first blob including pixels of at least a portion of one or more foreground objects in one or more video frames;
        detect a split of the first blob and a second blob in a current video frame; and
        reset a motion model of the first tracker in response to detecting the split of the first blob and the second blob.

12. The apparatus of claim 11, wherein resetting the motion model includes eliminating from the motion model one or more previously determined locations for the first tracker.

13. The apparatus of claim 11, wherein the processor is further configured to:
    reinitialize the motion model of the first tracker using a location of the first blob in the current video frame.

14. The apparatus of claim 11, wherein the first blob and the second blob are merged into a merged blob in a previous video frame, the previous video frame being obtained earlier in time than the current video frame.

15. The apparatus of claim 14, wherein the first tracker and a second tracker are associated with the merged blob in the previous video frame.

16. The apparatus of claim 11, wherein the processor is further configured to:
    associate a third tracker with a merged blob in the current video frame, the merged blob including a third blob merged with a fourth blob, and wherein multiple trackers are associated with the merged blob in the current video frame; and
    update a motion model of the third tracker to include a predicted location of the third tracker in a next video frame, wherein the motion model is updated by using a previously predicted location of the third tracker as the predicted location of the third tracker in the next video frame in response to the third tracker being associated with the merged blob, the previously predicted location of the third tracker being determined using a blob location in a previous video frame.

17. The apparatus of claim 16, wherein the third tracker is associated with the third blob in the previous video frame, and wherein a fourth tracker is associated with the fourth blob in the previous video frame.

18. The apparatus of claim 16, wherein the blob location in the previous video frame includes a location of the third blob in the previous video frame before the third blob is merged with the fourth blob.

19. The apparatus of claim 11, wherein the motion model of the first tracker is maintained using a Kalman filter.

20. The apparatus of claim 11, wherein the motion model of the first tracker includes one or more locations of the first tracker, a velocity of the first tracker, and one or more sizes of one or more blobs associated with the first tracker.

21. A non-transitory computer readable medium having stored thereon instructions that when executed by a processor perform a method, comprising:
    associating a first tracker with a first blob, the first blob including pixels of at least a portion of one or more foreground objects in one or more video frames;
    detecting a split of the first blob and a second blob in a current video frame; and
    resetting a motion model of the first tracker in response to detecting the split of the first blob and the second blob.

22. The non-transitory computer readable medium of claim 21, wherein resetting the motion model includes eliminating from the motion model one or more previously determined locations for the first tracker.

23. The non-transitory computer readable medium of claim 21, further comprising:
    reinitializing the motion model of the first tracker using a location of the first blob in the current video frame.

24. The non-transitory computer readable medium of claim 21, wherein the first blob and the second blob are merged into a merged blob in a previous video frame, the previous video frame being obtained earlier in time than the current video frame.

25. The non-transitory computer readable medium of claim 24, wherein the first tracker and a second tracker are associated with the merged blob in the previous video frame.

26. The non-transitory computer readable medium of claim 21, further comprising:
    associating a third tracker with a merged blob in the current video frame, the merged blob including a third blob merged with a fourth blob, and wherein multiple trackers are associated with the merged blob in the current video frame; and
    updating a motion model of the third tracker to include a predicted location of the third tracker in a next video frame, wherein the motion model is updated by using a previously predicted location of the third tracker as the predicted location of the third tracker in the next video frame in response to the third tracker being associated with the merged blob, the previously predicted location of the third tracker being determined using a blob location in a previous video frame.

27. The non-transitory computer readable medium of claim 26, wherein the third tracker is associated with the third blob in the previous video frame, and wherein a fourth tracker is associated with the fourth blob in the previous video frame.

28. The non-transitory computer readable medium of claim 26, wherein the blob location in the previous video frame includes a location of the third blob in the previous video frame before the third blob is merged with the fourth blob.

29. The non-transitory computer readable medium of claim 21, wherein the motion model of the first tracker is maintained using a Kalman filter.

30. The non-transitory computer readable medium of claim 21, wherein the motion model of the first tracker includes one or more locations of the first tracker, a velocity of the first tracker, and one or more sizes of one or more blobs associated with the first tracker.

* * * * *